United States Patent
Murata et al.

(10) Patent No.: US 9,070,935 B2
(45) Date of Patent: Jun. 30, 2015

(54) MULTILAYER POROUS FILM

(75) Inventors: Hiroshi Murata, Tokyo (JP); Hidenori Iwasawa, Tokyo (JP); Hirosuke Naruto, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 804 days.

(21) Appl. No.: 12/663,510

(22) PCT Filed: Jun. 6, 2008

(86) PCT No.: PCT/JP2008/060479
§ 371 (c)(1),
(2), (4) Date: Dec. 7, 2009

(87) PCT Pub. No.: WO2008/149986
PCT Pub. Date: Dec. 11, 2008

(65) Prior Publication Data
US 2010/0203396 A1 Aug. 12, 2010

(30) Foreign Application Priority Data

| Jun. 6, 2007 | (JP) | 2007-150001 |
| Sep. 28, 2007 | (JP) | 2007-255689 |
| Sep. 28, 2007 | (JP) | 2007-255690 |
| Nov. 22, 2007 | (JP) | 2007-302733 |

(51) Int. Cl.
*H01M 2/16* (2006.01)

(52) U.S. Cl.
CPC ............ *H01M 2/166* (2013.01); *H01M 2/1653* (2013.01); *H01M 2/1686* (2013.01)

(58) Field of Classification Search
USPC .................................................. 429/247, 251
See application file for complete search history.

(56) References Cited

U.S. PATENT DOCUMENTS

| 4,369,238 A | * | 1/1983 | Hasegawa et al. | 429/252 |
| 4,650,730 A | * | 3/1987 | Lundquist et al. | 429/62 |
| 5,641,565 A | * | 6/1997 | Sogo | 428/315.7 |
| 6,080,507 A | * | 6/2000 | Yu | 429/62 |
| 6,432,586 B1 | | 8/2002 | Zhang | |

(Continued)

FOREIGN PATENT DOCUMENTS

| CA | 2 627 137 | 5/2007 |
| CA | 2 627 811 | 5/2007 |

(Continued)

OTHER PUBLICATIONS

Office Action dated Dec. 23, 2011 issued in corresponding Taiwan patent application.

(Continued)

*Primary Examiner* — Patrick Ryan
*Assistant Examiner* — Lucas J O'Donnell
(74) *Attorney, Agent, or Firm* — Finnegan, Henderson, Farabow, Garrett & Dunner, LLP

(57) ABSTRACT

Provided is a multilayer porous film having a porous film comprised of a resin composition comprising a polypropylene and one or more polyolefins other than polypropylenes and an inorganic filler-containing porous layer stacked on at least on one side of the porous film. The multilayer porous film is capable of preventing short circuit between two electrodes even when a heat generation amount is large at the time of abnormal heat generation and therefore satisfying both excellent heat resistance and good shutdown function.

18 Claims, 4 Drawing Sheets

(56) References Cited

U.S. PATENT DOCUMENTS

| | | | |
|---|---|---|---|
| 6,627,346 | B1 | 9/2003 | Kinouchi et al. |
| 6,723,476 | B2 | 4/2004 | Yang |
| 2006/0115639 | A1 | 6/2006 | de Vries et al. |
| 2007/0122715 | A1* | 5/2007 | Fujino et al. ............... 429/251 |
| 2008/0193833 | A1* | 8/2008 | Ohashi et al. ............... 429/129 |
| 2008/0268345 | A1* | 10/2008 | Zhang et al. ............... 429/247 |
| 2009/0098450 | A1* | 4/2009 | Kikuchi et al. ............. 429/145 |
| 2009/0111025 | A1* | 4/2009 | Lee et al. ................... 429/251 |
| 2009/0181295 | A1 | 7/2009 | Usami et al. |
| 2011/0305940 | A1* | 12/2011 | Usami et al. ............... 429/144 |
| 2012/0135317 | A1* | 5/2012 | Nakashima et al. ........ 429/338 |

FOREIGN PATENT DOCUMENTS

| | | | |
|---|---|---|---|
| EP | 1 717 885 | A1 | 11/2006 |
| EP | 1 787 805 | A1 | 5/2007 |
| EP | 1 935 621 | A1 | 6/2008 |
| JP | 11-080395 | | 3/1999 |
| JP | 11-329390 | | 11/1999 |
| JP | 2001-080660 | | 3/2001 |
| JP | 2002-321323 | | 11/2002 |
| JP | 2004-227972 | | 8/2004 |
| JP | 3756815 | | 1/2006 |
| JP | 3797729 | | 4/2006 |
| JP | 2007-506587 | | 3/2007 |
| WO | WO 2005067080 A1 * | | 7/2005 .............. H01M 4/02 |
| WO | WO 2006038532 A1 * | | 4/2006 |
| WO | WO 2006068428 A1 * | | 6/2006 |
| WO | WO 2007/034856 A1 | | 3/2007 |
| WO | WO 2007/049568 A1 | | 5/2007 |
| WO | WO 2007049568 A1 * | | 5/2007 |

OTHER PUBLICATIONS

Office Action dated May 30, 2011 issued in corresponding Japanese patent application.
Supplementary European Search Report dated Aug. 12, 2010 issued in corresponding European Application No. 08765292.1-2119.
International Preliminary Report on Patentability (PCT/JP2008/060479), dated Dec. 17, 2009.
Extended European Search Report for EP Application No. 12177725.4 dated Sep. 19, 2012.
Fujiwara, Shinji et al., Development of New High-Purity Alumina, Sumitomo Kagaku, vol. 2007-1.
Sumitomo Chemical Product Databook—High Purity Alumina (HPA) (2014).

* cited by examiner

MULTILAYER POROUS FILM

TECHNICAL FIELD

The present invention relates to a multilayer porous film suited for use in separation, purification, or the like of various substances.

The present invention also relates to a battery separator, that is, a multilayer porous film particularly suited as a film provided between a positive electrode and a negative electrode in a battery; and a preparation process thereof.

The present invention further relates to a separator for nonaqueous electrolyte battery and a nonaqueous electrolyte battery, each using the multilayer porous film.

BACKGROUND ART

Polyolefin porous films have been used widely as a separator in batteries, capacitors, and the like because of their excellent electrical insulation properties and ion permeability. Particularly in recent years, lithium ion secondary batteries of high power density and high capacity density have been used as a power source of mobile phones required to incorporate an increasing number of functions and be light in weight. Polyolefin porous films are mainly used as a separator for such batteries.

Although lithium ion secondary batteries have a high power density and capacity density, an organic solvent used for their electrolytic solution is decomposed by heat generated due to abnormal circumstances such as short circuit and overcharge and it may lead to ignition at worst. Lithium ion secondary batteries are equipped with some safety functions in order to prevent such circumstances. One of them is a shutdown function of a separator. The shutdown function means a function of closing micropores of the separator by heat melting or the like to suppress ion conduction in the electrolytic solution and stop the progress of an electrochemical reaction when abnormal heat generation of batteries occurs. Separators having a lower shutdown temperature are regarded to have higher safety. Polyethylenes are used as a component of the separator partly because they have an adequate shutdown temperature. In batteries having a high energy, however, a temperature in them continues to increase even if the progress of the electrochemical reaction is terminated by shutdown, which may result in film breakage due to heat shrinkage of the separator and occurrence of short circuit between two electrodes.

With a view to overcoming such a problem, there is proposed a method of forming a layer comprising an inorganic filler between a separator and an electrode (Patent Document 1). This method enables to prevent short circuit between two electrodes because the inorganic filler-containing layer exists as an insulation layer even if a temperature continues to increase and exceeds the shutdown temperature and as a result, the separator breaks.

Patent Document 1: Japanese Patent No. 3756815

DISCLOSURE OF THE INVENTION

Problems to be Solved by the Invention

Capacity of batteries however has been increasing in recent years. In such batteries with high capacity, a heat generation amount at the time of abnormal heat generation is large. Once abnormal heat generation occurs, the separator is broken so badly that it cannot retain the inorganic filler-containing layer thereon any more. Even if the separator is provided with the inorganic filler-containing layer, short circuit between both electrodes cannot therefore be prevented at the time of abnormal heat generation.

This short circuit problem at the time of abnormal heat generation however can be resolved by using a polyolefin having a high melting point as a material for a porous film for separator, thereby improving heat resistance of the porous film. When a porous film is used as a battery separator, it is required to melt under heat at the shutdown temperature and close pores (shutdown function). Using a polyolefin having a high melting point as a material of a porous film then causes another problem that the shutdown temperature becomes too high or shutdown does not occur.

The short circuit problem at the time of abnormal heat generation can also be resolved by increasing the thickness of an inorganic filler-containing layer to be stacked over the separator. An increase in the thickness of the inorganic filler-containing layer however raises a volume occupied by the separator in the battery, which is disadvantageous from the standpoint of capacity increase of batteries. In addition, the increase in the thickness of the inorganic filler-containing layer tends to raise gas permeability of the separator.

An object of the present invention is therefore to provide a multilayer porous film capable of simultaneously achieving excellent heat resistance enabling prevention of short circuit between two electrodes and a good shutdown function, even when an amount of heat generation at the time of abnormal heat generation is large.

Another object of the present invention is to provide a multilayer porous film having a very thin inorganic filler-containing layer excellent in heat resistance and permeability.

A further object of the present invention is to provide a preparation process capable of providing such a multilayer porous film, a separator for nonaqueous electrolyte battery having high safety and suited for capacity increase of the battery, and a nonaqueous electrolyte battery.

Means for Solving the Problems

The present inventors have carried out an intensive investigation with a view to overcoming the above-described first problem. As a result, it has been found that a polyolefin porous film obtained by stacking an inorganic filler-containing layer has greatly improved heat resistance and does not cause short circuit even at high temperatures of 200° C. or greater by incorporating only a slight amount of a polypropylene in the porous film, leading to the completion of the present invention.

Further, the present inventors have conducted an intensive investigation with a view to overcoming the above-described second problem. As a result, it has been found that a polyolefin porous film obtained by stacking an inorganic filler-containing layer has greatly improved heat resistance even if the inorganic filler layer is very thin, has a remarkably suppressed heat shrinkage ratio at high temperatures, and does not cause short circuit even at high temperatures of 200° C. or greater, though having a good shutdown function by using, as the inorganic filler, any of (i) alumina particles having an average particle diameter within a specific range, (ii) alumina particles comprising particles having a particle diameter within a specific range in a specific amount or greater, and (iii) particles comprising light calcium carbonate as a main component thereof.

Specifically, the present invention provides the following aspects:

In a first aspect of the present invention, there is provided a multilayer porous film having a porous film composed of a resin composition comprising a polypropylene and one or more polyolefins other than polypropylenes and a porous layer obtained by stacking on at least one side of the porous film and comprising an inorganic filler and a resin binder.

In a second aspect of the present invention, there is provided a multilayer porous film comprising, on at least one side of a porous film comprising a polyolefin resin as a main component thereof, a porous layer which is composed of a resin binder and alumina particles having an average particle diameter of 0.5 µm or greater but not greater than 1.2 µm.

In a third aspect of the present invention, there is provided a multilayer porous film comprising, on at least one side of a porous film comprising a polyolefin resin as a main component thereof, a porous layer which is composed of a resin binder and alumina particles, 50% or greater of the total number of the alumina particles having a particle diameter of 0.4 µm or greater but not greater than 1.5 µm.

In a fourth aspect of the present invention, there is provided a multilayer porous film comprising, on at least one side of a porous film comprising a polyolefin resin as a main component thereof, a porous layer which is composed of a resin binder and particles comprising light calcium carbonate as a main component thereof.

Effect of the Invention

According to the first aspect of the present invention, a multilayer porous film which can withstand even high temperatures of 200° C. or greater and thus has high heat resistance can be provided.

In addition, a multilayer porous film having a good shutdown function and heat resistance can be provided according to the first aspect of the present application so that a battery with high safety can be manufactured by using it.

According to the second to fourth aspects of the present invention in which specific particles are used as an inorganic filler, a multilayer porous film having a markedly suppressed thermal shrinkage ratio at high temperatures and capable of withstanding even high temperatures of 200° C. or greater and thus having high heat resistance can be provided even when the thickness of the inorganic filler-comprising layer is reduced. It is therefore possible to manufacture batteries having high safety and at the same time having a low separator occupancy that satisfy a demand for capacity increase by using the multilayer porous film.

BEST MODE FOR CARRYING OUT THE INVENTION

Figure 1:
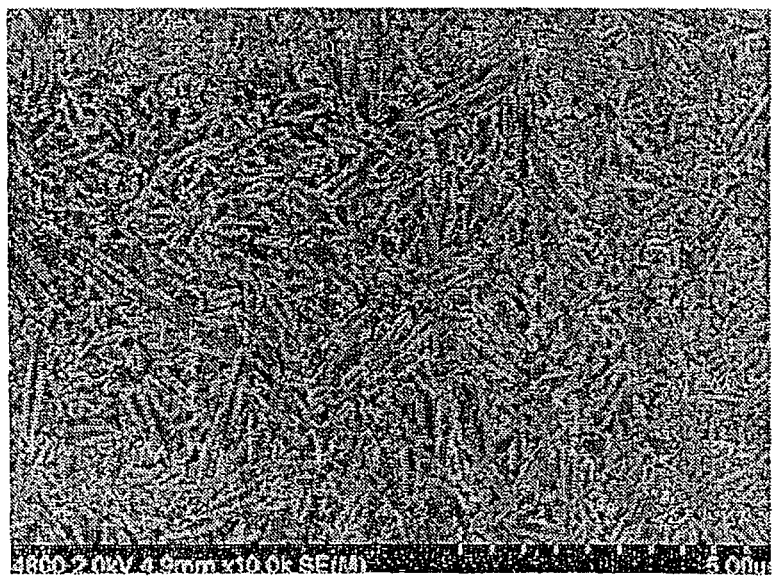
FIG. 1 is a scanning electron microscope image of the calcium carbonate particles used in Example 4-1.

The present invention will hereinafter be described specifically.

First, the porous film will be described.

In the second to fourth aspects of the present invention, the porous film comprises, as a main component thereof, a polyolefin resin. The term "comprising a polyolefin resin as a main component thereof" as used herein means that the percentage (mass %) of the polyolefin resin is the highest of all the resin components constituting the porous film.

As the porous film comprising a polyolefin resin as a main component thereof, a porous film comprising a polyolefin resin in an amount of 50% or greater but not greater than 100% based on the mass fraction of the resin components constituting the porous film is preferred from the standpoint of a shutdown performance of the porous film when it is used as a battery separator. The porous film contains the polyolefin resin in an amount of more preferably 60% or greater but not greater than 100%, even more preferably 70% or greater but not greater than 100%.

In the first aspect of the present invention and preferred embodiments of the second to fourth aspects of the present invention, the porous film is composed of a resin composition comprising a polypropylene and one or more polyolefins other than polypropylenes (which will hereinafter called "polyolefin resin composition").

In the first aspect of the present invention and the preferred embodiments of the second to fourth aspects of the present invention, the porous film has improved heat resistance by incorporating therein a polypropylene.

No limitation is imposed on the steric structure of the polypropylene and it may be any of isotactic polypropylene, syndiotactic polypropylene, and atactic polypropylene.

No particular limitation is imposed on the content of the polypropylene in the polyolefin resin composition. With an increase in the polypropylene content, the porous film tends to have higher heat resistance. Even if the polypropylene content is several mass % or so, it has a sufficient improving effect on heat resistance. When the multilayer porous film of the present invention is used as a battery separator, the film is required to thermally melt at a shutdown temperature to close pores therewith. Since a polypropylene has a relatively high melting point, an excessively large polypropylene content raises the shutdown temperature or prevents occurrence of shutdown.

From the standpoint of satisfying both heat resistance and good shutdown function, the polypropylene is added in an amount of preferably from 0.5 to 35 mass %, more preferably from 1 to 30 mass %, still more preferably from 1 to 10 mass %, even more preferably from 5 to 10 mass % based on the total amount of the polyolefins in the polyolefin resin composition.

In the first to fourth aspects of the present invention, the term "polyolefin" or "polyolefin resin" means a polymer comprising an olefinic hydrocarbon as a monomer component. The term "polyolefin" includes a copolymer of an olefinic hydrocarbon and a monomer other than an olefin and the copolymerization ratio of an olefinic hydrocarbon unit is preferably 95 mass % or greater, more preferably 97 mass % or greater, still more preferably 99 mass % or greater. It is to be noted that in the present invention, "polyolefin resin" and "polyolefin" have the same meaning. No limitation is imposed on the polyolefin other than polypropylenes to be used in the first to fourth aspects of the present invention and examples of it include homopolymers or copolymers of an olefinic hydrocarbon such as ethylene, 1-butene, 4-methyl-1-pentene, 1-hexene, and 1-octene. Specific examples include polyethylenes such as low-density polyethylene, linear low-density polyethylene, medium-density polyethylene, high-density polyethylene, and ultra high molecular weight polyethylene; polybutene; ethylene-propylene random copolymer; and ethylene propylene rubber.

When the multilayer porous film of the present invention is used as a battery separator or the like and it is required to thermally melt to close its pores and cause shutdown, use of, as the polyolefin other than polypropylenes, a polyethylene such as low density polyethylene, linear low density polyethylene, medium density polyethylene, high density polyethylene, or ultra high molecular weight polyethylene is preferred. Of these, use of a polyethylene having a density, as measured in accordance with JIS K 7112, of 0.93 or greater is preferred from the standpoint of strength.

The polypropylene or polyolefin other than polypropylenes to be used in the first to fourth aspects of the present invention preferably has a viscosity-average molecular weight of 30000 or greater but not greater than 12000000, more preferably 50000 or greater but less than 2000000, still more preferably 100000 or greater but less than 1000000.

Viscosity-average molecular weights of 30000 or greater are preferred, because they improve molding or forming properties due to an increase in a melt tension during melt molding or forming and at the same time, they improve strength as a result of the intertwining of polymers. On the other hand, viscosity-average molecular weights not greater than 12000000 are preferred, because they facilitate uniform melt kneading, leading to excellent molding or forming properties into a sheet, in particular, thickness stability. Further, when the multilayer porous film of the present invention is used as a battery separator, viscosity-average molecular weights less than 1000000 are preferred, because they facilitate closing of pores during temperature elevation and enable to impart a good shutdown function to the porous film. Instead of single use of the polyolefin having a viscosity-average molecular weight less than 1000000, a polyolefin having a viscosity-average molecular weight of 2000000 may be mixed with a polyolefin having a viscosity-average molecular weight of 270000 to adjust the viscosity-average molecular weight of the mixture to less than 1000000.

The porous film comprising, as a main component thereof, a polyolefin resin or the polyolefin resin composition in the first to fourth aspects of the present invention may comprise, in addition to the polyolefin, any additives, depending on its intended use, so long as they does not impair the objects of the present invention. Examples of such an additives include polymers other than polyolefins; inorganic fillers; phenolic, phosphoric, or sulfuric antioxidants; metal soaps such as calcium stearate and zinc stearate; ultraviolet absorbers; light stabilizers; antistatic agents; anti-fogging agents; and coloring pigments.

The total amount of these additives is preferably 20 parts by mass or less, more preferably 10 parts by mass, still more preferably 5 parts by mass based on 100 parts by mass of the polyolefin resin composition.

No limitation is imposed on the average pore size of the porous film in the first to fourth aspects of the present invention and it can be determined as needed, depending on the intended use. When the multilayer porous film is used as a battery separator, the pore size is usually from about 0.001 to 10 μm, preferably from about 0.01 to 1 μm.

In the present invention, no limitation is imposed on a process for preparing a porous film from the resin composition comprising a polyolefin resin as a main component thereof or from the polyolefin resin composition and any known preparation process can be employed. Examples include a process of melt kneading a polyolefin resin composition and a plasticizer and molding or forming the resulting kneaded product into a sheet-like product, drawing the sheet-like product if necessary, and extracting the plasticizer to make the sheet-like product porous; a process of melt kneading the polyolefin resin composition, extruding the resulting kneaded product at a high draw ratio, and carrying out heat treatment and drawing to separate the polyolefin crystal interface and make the product porous; a process of melt kneading the polyolefin resin composition and an inorganic filler, molding or forming the kneaded product into a sheet-like product, drawing the sheet-like product to separate the interface between the polyolefin and the inorganic filler to make it porous; and a process of dissolving the polyolefin resin composition and immersing the resulting solution in a poor solvent of the polyolefin to simultaneously coagulate the polyolefin and remove the solvent to make it porous.

As one example of the preparation processes of the porous film in the first to fourth aspects of the present invention, the process of melt kneading the polyolefin resin composition and a plasticizer, molding or forming the resulting kneaded product into a sheet-like product, and then extracting the plasticizer will next be described.

First, the polyolefin resin composition and a plasticizer are melt kneaded. Examples of the melt kneading method include a method of pouring a polypropylene, polyolefins other than polypropylenes, and other additives, if necessary, in a resin kneading apparatus such as extruder, kneader, Labo Plastomill, kneading roller, or Banbury mixer; and kneading while melting the resin components under heat and introducing the plasticizer therein at an arbitrary ratio. In this method, it is preferred to knead, at a predetermined ratio, the polypropylene, the polyolefin other than polypropylenes, the additives, and the plasticizer in a Henschel mixer or the like prior to pouring them in the resin kneading apparatus. It is more preferred that only a portion of the plasticizer is poured in preliminary kneading and main kneading is performed while side-feeding the remaining portion of the plasticizer to the resin kneading apparatus. This improves the dispersibility of the plasticizer, making it possible to draw, in the later step, the sheet-like product obtained from the melt kneaded product of the resin composition and the plasticizer at a high draw ratio without causing film breakage.

As the plasticizer, nonvolatile solvents capable of forming a uniform solution at a temperature equal to or higher than the melting point of the polyolefin can be used. Specific examples of such a nonvolatile solvent include hydrocarbons such as liquid paraffin and paraffin wax, esters such as dioctyl phthalate and dibutyl phthalate, and higher alcohols such as oleyl alcohol and stearyl alcohol.

Of these, liquid paraffin is preferred because due to high compatibility with the polyethylene or polypropylene, interfacial separation between the resin and the plasticizer does not occur easily even if the melt kneaded product is drawn so that it facilitates uniform drawing.

No particular limitation is imposed on the ratio of the polyolefin resin composition and the plasticizer insofar as it is within a range permitting uniform melt kneading and molding or forming of the resulting product into a sheet shape. For example, the mass fraction of the plasticizer in the composition composed of the polyolefin resin composition and the plasticizer is preferably from 30 to 80 mass %, more preferably from 40 to 70 mass %. When the mass fraction of the plasticizer is not greater than 80 mass %, melt tension at the time of melt molding or forming does not become insufficient and tends to lead to improvement in molding or forming properties. When the mass fraction is 30 mass % or greater, on the other hand, breakage of the polyolefin chain does not occur even by drawing the mixture of the polyolefin resin composition and the plasticizer at a high draw ratio, a uniform and fine pore structure can be formed, and strength is likely to increase.

The melt kneaded product is then molded or formed into a sheet shape. The sheet-like product is obtained, for example, by extruding the melt kneaded product into a sheet shape through a T die or the like and bringing it into contact with a heat conductor to cool it to a temperature sufficiently lower than the crystallization temperature of the resin component, thereby solidifying it. As the heat conductor used for cooling and solidification, metals, water, air, and the plasticizer itself are usable, but rolls made of a metal are preferred because of their high heat conduction efficiency. When the sheet-like product is brought into contact with rolls, sandwiching the sheet-like product therebetween is more preferable because it increases a heat conduction efficiency further and at the same time, causes orientation of the sheet, leading to an increase in the film strength and improvement in the surface smoothness of the sheet. The die lip distance at the time of extruding the melt kneaded product into a sheet shape is preferably 400 µm or greater but not greater than 3000 µm, more preferably 500 µm or greater but not greater than 2500 µm. When the die lip distance is 400 µm or greater, die lip build up and the like are suppressed and influence of streaks or defects on the film quality is small so that film breakage or the like can be prevented in the subsequent drawing step. When the die lip distance is 3000 µm or less, on the other hand, a cooling rate is high enough to prevent cooling unevenness and at the same time, thickness stability of the sheet can be maintained.

The sheet-like product thus obtained is preferably drawn. As drawing, both uniaxial drawing and biaxial drawing are preferred, but the biaxial drawing is more preferred from the standpoint of the strength of the porous film thus obtained. When the sheet-like product is drawn at a high draw ratio in biaxial directions, molecules are oriented in the plane direction and the porous film obtained as a final product does not tear easily and has high puncture strength. Examples of the drawing method include simultaneous biaxial drawing, sequential biaxial drawing, multi-stage drawing, and multiple-times drawing. Of these, simultaneous biaxial drawing is preferred from the standpoint of improvement in puncture strength, uniform drawing, and shutdown properties.

The term "simultaneous biaxial drawing" as used herein means a drawing method in which drawing in MD and drawing in TD are performed simultaneously. The draw ratios in these two directions may be different from each other. The term "sequential biaxial drawing" means a drawing method in which drawing in MD and drawing in TD are performed independently. Upon drawing in either one of MD or TD, the sheet-like product is unconstrained in the other direction or is fixed at a predetermined length.

The draw ratio is preferably in a range of 20 or greater but not greater than 100, more preferably in a range of 25 or greater but not greater than 50, in terms of an areal ratio. With regard to the draw ratio in each axial direction, the draw ratio is preferably in a range of 4 or greater but not greater than 10 in MD and in a range of 4 or greater but not greater than 10 in TD. The draw ratio is more preferably in a range of 5 or greater but not greater than 8 in MD and in a range of 5 or greater but not greater than 8 in TD. When a total areal ratio is 20 or greater, the porous film thus obtained can have sufficient strength. Total areal ratios not greater than 100 can prevent film breakage in the drawing step and provide high productivity.

The sheet-like product may be rolled. Rolling can be performed by pressing using, for example, a double belt press. Rolling can increase the orientation particularly in the surface-layer portion. A rolling areal ratio is preferably greater than 1 but not greater than 3, more preferably greater than 1 but not greater than 2. Rolling ratios greater than 1 increase the plane orientation, leading to an increase in the film strength of the porous film obtained as a final product. Rolling ratios not greater than 3, on the other hand, are preferred because due to a small orientation difference between the surface layer portion and center inner portion, a porous structure uniform in the film thickness direction can be formed.

Then, the plasticizer is removed from the sheet-like product to obtain a porous film. The plasticizer is removed, for example, by immersing the sheet-like product in an extraction solvent to extract the plasticizer and then drying sufficiently. The extraction method of the plasticizer may be either a batch method or a continuous method. To suppress shrinkage of the porous film, the edge portions of the sheet-like product are preferably constrained during a series of immersion and drying steps. In addition, the remaining amount of the plasticizer in the porous film is controlled to preferably less than 1 mass %.

The extraction solvent is preferably a poor solvent for the polyolefin resin and at the same time, a good solvent for the plasticizer and has a boiling point lower than the melting point of the polyolefin resin. Examples of such an extraction solvent include hydrocarbons such as n-hexane and cyclohexane, halogenated hydrocarbons such as methylene chloride and 1,1,1-trichloroethane, non-chlorine-based halogenated solvents such as hydrofluoroether and hydrofluorocarbon, alcohols such as ethanol and isopropanol, ethers such as diethyl ether and tetrahydrofuran, and ketones such as acetone and methyl ethyl ketone. These extraction solvents may be re-used after collected by distillation or the like operation.

In order to prevent the shrinkage of the porous film, heat treatment such as heat fixation or heat relaxation may be performed after the drawing step or after formation of the porous film. Alternatively, the porous film may be subjected to post treatment such as hydrophilization with a surfactant or the like or crosslinking treatment or the like with ionizing radiation or the like.

The porous layer will next be described.

The multilayer porous film according to the first to fourth aspects of the present invention has, on at least one side of the porous film, a porous layer comprising an inorganic filler and a resin binder. This enables to suppress heat shrinkage of the porous film and prevent short circuit due to film breakage.

The porous layer comprising the inorganic filler may be stacked only on one side of the porous film or may be stacked on both sides thereof.

The inorganic filler contained in the porous layer in the first aspect of the present invention preferably has a melting point of 200° C. or greater, has high electrical insulation properties, and at the same time is electrochemically stable under using conditions when the multilayer porous film is used as a battery separator.

Specific examples of the inorganic filler include oxide based ceramics such as alumina, silica, titania, zirconia, magnesia, ceria, yttria, zinc oxide, and iron oxide, nitride based ceramics such as silicon nitride, titanium nitride, and boron nitride, ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, and silica sand, and glass fibers. They may be used either singly or as a mixture of two or more thereof.

When the multilayer porous film of the present invention is used as a battery separator, using alumina or titania as the inorganic filler is preferred from the standpoint of electrochemical stability.

The inorganic filler has an average particle diameter of preferably 0.1 µm or greater but not greater than 3 µm, more preferably 0.2 µm or greater but not greater than 1 µm. When the inorganic filler has an average particle diameter less than 0.1 μm, the short-circuit temperature tends to be low when the resulting multilayer porous film is used as a battery separator. When the inorganic filler has an average particle diameter exceeding 3 μm, on the other hand, it becomes difficult to form a thin porous layer.

As the inorganic filler, particularly preferred are (i) alumina particles having an average particle diameter of 0.5 μm or greater but not greater than 1.2 μm, (ii) alumina particles, 50% or greater, based on the total number of the particles, of which have a particle diameter of 0.4 μm or greater but not greater than 1.5 μm, and (iii) particles comprising, as a main component thereof, light calcium carbonate. When these particles are used as the inorganic filler, even if the inorganic filler-containing layer is thinned, the separator can have sufficient heat resistance.

These inorganic fillers will next be described specifically.

First, the alumina particles (i) having an average particle diameter of 0.5 μm or greater but not greater than 1.2 μm will be described.

In the preferred embodiment of the first aspect of the present invention and in the second aspect of the present invention, alumina particles having an average particle diameter of 0.5 μm or greater but not greater than 1.2 μm are used as the inorganic filler constituting the porous layer. Using such particles enables to suppress heat shrinkage of the porous film at high temperatures even if the porous layer has a smaller thickness and therefore achieve excellent heat resistance.

The average particle diameter of the alumina particles is more preferably 0.5 μm or greater but not greater than 0.9 μm, most preferably 0.55 μm or greater but not greater than 0.85 μm. Even if alumina having an average particle diameter of 0.5 μm or less or 1.2 μm or greater is used, heat shrinkage at high temperatures can be suppressed by an increase in the thickness of the porous layer. When the thickness of the porous layer is decreased to 6 μm or less, however, it becomes difficult to suppress heat shrinkage at high temperatures.

In the present invention, the average particle diameter of the alumina particles is the particle diameter at which the cumulative frequency of the number of particles is 50% when measuring particle diameter distribution by using a laser type particle diameter distribution analyzer while using water as a dispersion medium.

In the particle diameter distribution of alumina particles having an average particle diameter of 0.5 μm or greater but not greater than 1.2 μm, 50% or greater of the total number of particles have preferably a particle diameter of 0.4 μm or greater but not greater than 1.5 μm. Using alumina particles having such a particle diameter distribution enables to suppress heat shrinkage of the porous film at high temperatures even if the porous layer has a smaller thickness and therefore achieve excellent heat resistance.

The content of alumina particles having a particle diameter of 0.4 μm or greater but not greater than 1.5 μm is preferably 55% or greater, more preferably 60% or greater, most preferably 65% or greater. Using alumina particles having such a particle diameter distribution enables to further improve a suppressing effect of heat shrinkage at high temperatures and suppress heat shrinkage at high temperatures even if the thickness of the porous layer is reduced to 6 μm or less.

In the present application, the particle diameter distribution of the alumina particles is determined by using a laser type particle diameter distribution analyzer while using water as a dispersion medium.

It is more preferred that the alumina particles having an average particle diameter of 0.5 μm or greater but not greater than 1.2 μm satisfy the above-described requirements and at the same time, contain alumina particles having a particle diameter of 0.5 μm or greater but not greater than 1.5 μm in an amount of 45% or greater, more preferably 50% or greater. Above all, the content of alumina particles having a particle diameter of 0.5 μm or greater but 35% or greater, more preferably 40% or greater.

Alumina has many crystalline forms such as α-alumina, β-alumina, γ-alumina, and θ-alumina and any of them is suited for use. Of these, α-alumina is most preferred because it is thermally/chemically stable.

Alumina particles have various shapes, depending on their manufacturing method, for example, spherical, oval, rectangular, and amorphous. Alumina particles of any shape are usable insofar as they have an average particle diameter of 0.5 μm or greater but not greater than 1.2 μm.

Next, the alumina particles (ii) 50% or greater, based on the total number of the particles, of which have a particle diameter of 0.4 μm or greater but not greater than 1.5 μm will be described.

In the preferred embodiment of the first aspect of the present invention and in the third aspect of the present invention, alumina particles, 50% or greater, based on the total number of the particles, of which have a particle diameter of 0.4 μm or greater but not greater than 1.5 μm are employed as the inorganic filler constituting the porous layer. Using such particles enables to suppress heat shrinkage of the porous film even if the porous layer has a smaller thickness and therefore achieve excellent heat resistance. The content of the alumina particles having a particle diameter of 0.4 μm or greater but not greater than 1.5 μm is preferably 55% or greater, more preferably 60% or greater, most preferably 65% or greater. Even if the content of alumina particles having a particle diameter of 0.4 μm or greater but not greater than 1.5 μm is less than 50%, heat shrinkage at high temperatures can be suppressed by increasing the thickness of the porous layer. When the thickness of the porous layer is reduced to 6 μm or less, however, it becomes difficult to suppress heat shrinkage at high temperatures.

In the present application, the particle diameter distribution of the alumina particles is determined by using a laser type particle diameter distribution analyzer while using water as a dispersion medium.

It is more preferred that the alumina particles, 50% or greater, based on the total number of the particles, of which have a particle diameter of 0.4 μm or greater but not greater than 1.5 μm satisfy the above-described requirements and at the same time, contain alumina particles having a particle diameter of greater than 0.5 μm but not greater than 1.5 μm in an amount of 45% or greater, more preferably 50% or greater. Above all, the content of the alumina particles having a particle diameter of 0.5 μm or greater but not greater than 1.2 μm is preferably 35% or greater, more preferably 40% or greater.

Further, the alumina particles, 50% or greater, based on the total number of the particles, of which have a particle diameter of 0.4 μm or greater but not greater than 1.5 μm have an average particle diameter of preferably 0.5 μm or greater but not greater than 1.2 μm, more preferably 0.5 μm or greater but not greater than 0.9 μm, most preferably 0.5 μm or greater but not greater than 0.85 μm. Using alumina particles having such an average particle diameter enables to further improve a heat shrinkage suppressive effect at high temperatures and suppress heat shrinkage at high temperatures even if the thickness of the porous layer is reduced to 6 μm or less.

In the present invention, the average particle diameter of alumina particles is the particle diameter at which the cumulative frequency of the number of particles is 50% when measuring particle diameter distribution by using a laser type particle diameter distribution analyzer while using water as a dispersion medium.

Alumina has many crystalline forms such as α-alumina, β-alumina, γ-alumina, and θ-alumina and any of them is suited for use. Of these, α-alumina is most preferred because it is thermally/chemically stable.

Alumina particles have various shapes, depending on their manufacturing method, for example, spherical, oval, rectangular, and amorphous. Any of alumina particles is suited for use insofar as 50% or greater of the total number of the particles have a particle diameter of 0.4 μm or greater but not greater than 1.5 μm.

Next, the particles (iii) comprising light calcium carbonate as a main component thereof will be described.

In the preferred embodiment of the present invention and in the fourth aspect of the present invention, particles comprising light calcium carbonate as a main component thereof are used as the inorganic filler constituting the porous layer. Using such particles enables to suppress heat shrinkage of the porous film at high temperatures even if the porous layer has a smaller thickness and achieve excellent heat resistance.

Light calcium carbonate is one of calcium carbonates prepared chemically by a carbon dioxide gas reaction process or soluble salt reaction process. Of the light calcium carbonate, columnar, needle-shaped, or spindle-shaped light calcium carbonate is suited for suppressing heat shrinkage of the resulting porous film at high temperatures even if the porous layer has a smaller thickness and thereby achieving excellent heat resistance. The term "columnar, needle-shaped, or spindle-shaped light calcium carbonate" means calcium carbonate prepared chemically by a carbon dioxide reaction process or soluble salt reaction process and having a major axis $L2$ of the particles at least 1.5 times greater than the minor axis $L1$ of the particles, that is, having a shape of $L2/L1 \geq 1.5$, more preferably $L2/L1 \geq 2$, still more preferably $L2/L1 \geq 3$. The minor axis $L1$ is preferably 0.005 μm or greater but not greater than 3 μm, more preferably 0.01 μm or greater but not greater than 1 μm, still more preferably 0.05 μm or greater but not greater than 0.5 μm in view of easy formation of a thinner porous layer. Although no particular limitation is imposed on the major axis $L2$, it is preferably 0.05 μm or greater but not greater than 5 μm, more preferably 0.1 μm or greater but not greater than 3 μm, still more preferably 0.2 μm or greater but not greater than 2 μm in order to readily disperse the particles in a coating solution for forming the porous layer.

The minor axis $L1$ and the major axis $L2$ of the particles are defined in the following manner. Particle powders are observed with a scanning electron microscope (which will hereinafter be abbreviated as "SEM"). After printing an arbitrary 15×15 μm view field to a photograph directly or by a negative, the major axis and the minor axis of each of 200 or more particles are measured. The average of the minor axis is designated as $L1$, while the average of the major axis is designated as $L2$.

The inorganic filler particles constituting the porous layer, insofar as they have light calcium carbonate as a main component, produce their effects even if other inorganic filler particles are mixed in them. The term "main component" means a component having the highest percentage (vol. %) among the components constituting the particles. From the standpoint of heat resistance and suppression of heat shrinkage at high temperatures, light calcium carbonate content is preferably 50% or greater, more preferably 60% or greater, still more preferably 70% or greater of the total volume of the inorganic filler particles.

The porous layer in the first to fourth aspects of the present invention contains, in addition to the inorganic filler, a resin binder for binding the inorganic filler onto the porous film. Although no limitation is imposed on the kind of the resin binder, when the multilayer porous film of the present invention is used as a separator for lithium ion secondary battery, the resin binder is preferably insoluble in an electrolytic solution of the lithium ion secondary battery and at the same time electrochemically stable within the range of use of the lithium ion secondary battery.

Specific examples of the resin binder include polyolefins such as polyethylene and polypropylene; fluorine-comprising resins such as polyvinylidene fluoride and polytetrafluoroethylene; fluorine-comprising rubbers such as vinylidene fluoride-hexafluoropropylene-tetrafluoroethylene copolymer and ethylene-tetrafluoroethylene copolymer; rubbers such as styrene-butadiene copolymer and hydride thereof, acrylonitrile-butadiene copolymer and hydride thereof, acrylonitrile-butadiene-styrene copolymer and hydride thereof, methacrylate-acrylate copolymer, styrene-acrylate copolymer, acrylonitrile-acrylate copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having a melting point and/or glass transition point of 180° C. or greater such as polyphenylene ether, polysulfone, polyether sulfone, polyphenylene sulfide, polyether imide, polyamide imide, polyamide, and polyester.

When polyvinyl alcohol is used as the resin binder, it has preferably a saponification degree of 85% or greater but not greater than 100%. Use of the resin binder having a saponification degree of 85% or greater is preferred because when the resulting multilayer porous film is used as a battery separator, it enables to improve a occurring-temperature of short circuit (short-circuit temperature) and achieve a good safety performance. The saponification degree is more preferably 90% or greater but not greater than 100%, still more preferably 95% or greater but not greater than 100%, especially preferably 99% or greater but not greater than 100%. The polymerization degree of the polyvinyl alcohol is preferably 200 or greater but not greater than 5000, more preferably 300 or greater but not greater than 4000, especially preferably 500 or greater but not greater than 3500. The polymerization degree of the polyvinyl alcohol is preferably 200 or greater because the inorganic filler can be bound onto the porous film with a small amount of the polyvinyl alcohol and an increase in the air permeability of the multilayer porous film due to the formation of the porous layer can be suppressed while maintaining the mechanical strength of the porous layer. In addition, the polymerization degree is preferably 5000 or less because gelation which will otherwise occur at the time of preparing a dispersion can be prevented.

Although the mass fraction of the inorganic filler in the porous layer can be determined as needed from the standpoint of binding property of the inorganic filler and permeability and heat resistance of the multilayer porous film, it is preferably 50% or greater but less than 100%, more preferably 55% or greater but not greater than 99.99%, still more preferably 60% or greater but not greater than 99.9%, especially preferably 65% or greater but not greater than 99%.

The thickness of the porous layer is preferably 0.5 μm or greater from the standpoint of the heat resistance of the multilayer porous film, and preferably not greater than 100 μm from the standpoint of air permeability and capacity increase of a battery. It is more preferably 1 μm or greater but not greater than 50 µm, still more preferably 2 µm or greater but not greater than 30 µm, most preferably 3 µm or greater but not greater than 20 µm.

When any of the above-described (i) to (iii) is used as the inorganic filler (i.e. the second to fourth aspects of the present invention), even if the thickness of the inorganic filler-containing layer is reduced, high shrinkage rate at high temperatures can be suppressed considerably so that the thickness of the porous layer is preferably 1.5 µm or greater but not greater than 10 µm, more preferably 2 µm or greater but not greater than 6 µm, most preferably 3 µm or greater but not greater than 6 µm.

Although there is no limitation on the formation method of the porous layer, it can be formed in a known manner. For example, the porous layer can be formed by applying, on at least one side of the porous film, a coating solution obtained by dispersing or dissolving the inorganic filler and the resin binder in a solvent.

The solvent of the coating solution is preferably capable of dispersing or dissolving therein the inorganic filler and the resin binder uniformly and stably. Examples include N-methylpyrrolidone, N,N-dimethylformamide, N,N-dimethylacetamide, water, ethanol, toluene, hot xylene, methylene chloride, and hexane.

The coating solution may contain various additives, for example, dispersants such as surfactant, thickeners, humectants, antifoaming agents, and pH regulators comprising an acid or alkali for the purpose of stabilizing dispersion or improving application properties. Although these additives are preferably removable at the time of removal of the solvent, they may remain in the porous layer insofar as they are electrochemically stable within the range of use of a lithium ion secondary battery, do not inhibit a battery reaction, and at the same time are stable up to about 200° C.

No particular limitation is imposed on the method of dissolving or dispersing the inorganic filler and the resin binder in the solvent insofar as it can realize solution or dispersion characteristics necessary for the application step. Examples include mechanical stirring with a ball mill, beads mill, planetary ball mill, oscillating mill, sand mill, colloid mill, attritor, roll mill, high-speed impeller dispersion, disperser, homogenizer, high-speed impact mill, ultrasonic dispersion, and agitating blade.

No particular limitation is imposed on the method of applying the coating solution to the porous film insofar as it can realize a desired layer thickness or coated area. Examples include gravure coating method, small-diameter gravure coating method, reverse roll coating method, transfer roll coating method, kiss coating method, dip coating method, knife coating method, air doctor coating method, blade coating method, rod coating method, squeeze coating method, cast coating method, die coating method, screen printing method, and spray coating method.

Surface treatment is preferably given onto the surface of the porous film prior to application because it facilitates application of the coating solution and at the same time, improves adhesion between the inorganic filler-comprising porous layer and the surface of the porous film after application. No particular limitation is imposed on the surface treatment method insofar as it does not remarkably damage the porous structure of the porous film. Examples include corona discharge treatment method, mechanical surface-roughening method, solvent treatment method, acid treatment method, and ultraviolet oxidation method.

No particular limitation is imposed on the method of removing the solvent from the coated film after application insofar as it does not adversely affect the porous film. Examples include a method of drying the porous film at a temperature not greater than the melting point thereof while fixing it, a method of drying under reduced pressure at a low temperature, and a method of immersing the film in a poor solvent for the resin binder and simultaneously carrying out solidification of the binder and extraction of the solvent.

Next, use of the multilayer porous film according to the first to fourth aspects of the present invention as a battery separator will next be used.

The multilayer porous films according to the first to fourth aspects of the present invention are excellent in heat resistance and have a shutdown function so that they are suited as a battery separator for separating a positive electrode and a negative electrode in the battery.

In particular, the multilayer porous films according to the first to fourth aspects of the present invention do not cause short circuit even at high temperatures of 200° C. or greater so that they can also be used safely as a separator for battery with high electromotive force.

Such a battery with high electromotive force is, for example, a nonaqueous electrolyte battery. The nonaqueous electrolyte battery can be fabricated by placing the multilayer porous film of the present invention between a positive electrode and a negative electrode and retaining a nonaqueous electrolytic solution.

There is no limitation on the positive electrode, negative electrode, and nonaqueous electrolytic solution and known ones are usable for them.

Examples of the positive electrode material include lithium-containing composite oxides such as $LiCoO_2$, $LiNiO_2$, spinel type $LiMnO_4$, and olivine type $LiFePO_4$, while those of the negative electrode material include carbon materials such as graphite, non-graphitizable carbon, easily graphitizable carbon, and composite carbon; silicon, tin, metal lithium, and various alloy materials.

As the nonaqueous electrolytic solution, electrolytic solutions obtained by dissolving an electrolyte in an organic solvent are usable. Examples of the organic solvent include propylene carbonate, ethylene carbonate, dimethyl carbonate, diethyl carbonate, and ethyl methyl carbonate, while examples of the electrolyte include lithium salts such as $LiClO_4$, $LiBF_4$, and $LiPF_6$.

When the multilayer porous films according to the first to fourth aspects of the present invention are used as a battery separator, the multilayer porous film has an air permeability of preferably 10 sec/100 cc or greater but not greater than 650 sec/100 cc, more preferably 20 sec/100 cc or greater but not greater than 500 sec/100 cc, still more preferably 30 sec/100 cc or greater but not greater than 450 sec/100 cc, especially preferably 50 sec/100 cc or greater but not greater than 400 sec/100 cc.

The multilayer porous film having an air permeability of 10 sec/100 cc or greater provides low self discharge when used as a battery separator, while the multilayer porous film having an air permeability of not greater than 650 sec/100 cc provides good charge/discharge characteristics.

Further, an increase rate of air permeability of the multilayer porous film due to the formation of a porous layer is preferably 0% or greater but not greater than 200%, more preferably 0% or greater but not greater than 100%, especially preferably 0% or greater but not greater than 70%. When the porous film has an air permeability of less than 100 sec/100 cc, it can be used preferably when an air permeability increase rate of the multilayer porous film after formation of a porous layer is 0% or greater but not greater than 500%.

The final thickness of the multilayer porous film is 2 µm or greater but not greater than 200 µm, more preferably 5 µm or greater but not greater than 100 μm, still more preferably 7 μm or greater but not greater than 50 μm.

The multilayer porous film having a thickness of 2 μm or greater has sufficient mechanical strength, and the multilayer porous film having a thickness not greater than 200 μm is advantageous from the standpoint of a capacity increase of a battery because the volume occupied by the separator decreases.

A heat shrinkage ratio of the multilayer porous film at 150° C. in each of MD direction and TD direction is preferably 0% or greater but not greater than 15%, more preferably 0% or greater but not greater than 10%, still more preferably 0% or greater but not greater than 5%. The heat shrinkage rate is preferably 15% or less in each of MD direction and TD direction because it enables to suppress breakage of the multilayer porous film at the time of abnormal heat generation of a battery and prevent occurrence of short circuit.

The shutdown temperature of the multilayer porous film is preferably 120° C. or greater but not greater than 160° C., more preferably 120° C. or greater but not greater than 150° C. If the shutdown temperature is not greater than 160° C., the current is interrupted immediately when heat is generated from the battery, thus a better safety performance can be achieved. If the shutdown temperature is 120° C. or greater, the battery can be used at around 100° C.

The short-circuit temperature of the multilayer porous film is preferably 180° C. or greater but not greater than 1000° C., more preferably 200° C. or greater but not greater than 1000° C. When the short-circuit temperature is 180° C. or greater, short circuit does not occur immediately even abnormal heat is generated from the battery and during this time lag, heat can be released and a better safety performance can be achieved.

In the present invention, the short-circuit temperature can be adjusted to a desired value by controlling the content of the polypropylene, kind of the polyolefin other than polypropylenes, kind of the inorganic filler, the thickness of the inorganic filler-comprising layer, or the like.

EXAMPLES

The present invention will hereinafter be described by Examples in further detail, which however do not limit the scope of the present invention. The following are measuring and testing methods in these Examples.

(1) Viscosity-Average Molecular Weight Mv of Polyolefin

Intrinsic viscosity [η](dl/g) at 135° C. in decalin as a solvent was determined in accordance with ASTM-D4020.

The intrinsic viscosity of polyethylene was calculated from the following equation:

$$[\eta]=6.77\times10^{-4} Mv^{0.67}$$

The Mv of polypropylene was calculated from the following equation.

$$[\eta]=1.10\times10^{-4} Mv^{0.80}$$

(2) Thickness of Porous Film and Thickness of Porous Layer

A sample of MD 10 mm×TD 10 mm was cut out from each of a porous film and a multilayer porous film and thicknesses at selected 9 positions (3 points×3 points) in lattice pattern were measured using a dial gauge ("PEACOCK No. 25", (trade mark), product of Ozaki Mfg. Co., Ltd.). The average of the measured values at 9 positions was determined to be a thickness (μm) of each of the porous film and multilayer porous film.

A difference in thickness between the multilayer porous film and the porous film was determined to be a thickness (μm) of the porous layer.

(3) Air Permeability (Sec/100 cc) of Porous Film and Air Permeability Increase (%) Due to Formation of Porous Layer Time (sec) required for 100 cc of air to pass through a porous film or a multilayer porous film having an area of 645 mm² (circle with a diameter of 28.6 mm) was measured using a Gurley-type air permeability tester ("G-B2", (trademark), product of Toyo Seiki seisaku-sho, Ltd., mass of inner cylinder: 567 g) based on JIS P-8117 and it was determined to be the air permeability of the porous film or the multilayer porous film.

An air permeability increase due to the formation of a porous layer was calculated from the following equation:

Air permeability increase(%)={(air permeability of multilayer porous film−air permeability of porous film)/air permeability of porous film}×100

(4) Shutdown Temperature and Short-Circuit Temperature of Multilayer Porous Film a. Preparation of Positive Electrode 92.2 parts by mass of a lithium cobalt composite oxide (LiCoO₂) as a positive electrode active material, 2.3 parts by mass of each of flake graphite and acetylene black as conducting materials, and 3.2 parts by mass of polyvinylidene fluoride (PVDF) as a resin binder were prepared. They were dispersed in N-methylpyrrolidone (NMP) to prepare a slurry. The slurry thus obtained was applied to one side of an aluminum foil of 20 μm thick serving as a positive electrode current collector by using a die coater to give a coating weight of 250 g/m² in terms of the positive electrode active material. After drying at 130° C. for 3 minutes, the resulting aluminum foil was compression molded with a roll press to give a bulk density of 3.00 g/cm³ in terms of the positive electrode active material, whereby a positive electrode was obtained.

b. Preparation of Negative Electrode 96.6 parts by mass of artificial graphite as a negative electrode active material and 1.4 parts by mass of an ammonium salt of carboxymethyl cellulose and 1.7 parts by mass of a styrene-butadiene copolymer latex as resin binders were prepared. They were dispersed in purified water to prepare a slurry. The slurry thus obtained was applied to one side of a copper foil of 12 μm thick serving as a negative electrode current collector by using a die coater to give a coating weight of 106 g/m² in terms of the negative electrode active material. After drying at 120° C. for 3 minutes, the resulting copper foil was compression molded with a roll press to give a bulk density of 1.35 g/cm³ in terms of the negative electrode active material, whereby a negative electrode was obtained.

c. Preparation of Nonaqueous Electrolytic Solution

A nonaqueous electrolytic solution was prepared by dissolving, in a mixed solvent of propylene carbonate:ethylene carbonate:γ-butyrolactone=1:1:2 (volume ratio), LiBF₄ as a solute to give its concentration of 1.0 mol/L.

d. Measurement of Shutdown Temperature and Short-Circuit Temperature

The negative electrode which had been cut into a piece of 65 mm×20 mm and immersed in the nonaqueous electrolytic solution for 1 minute or greater, an aromatic polyamide film of 9 μm (thick)×50 mm×50 mm having, at the center thereof, a hole of 16 mm diameter, a multilayer porous film (porous film) which had been cut into a piece of 65 mm×20 mm and immersed in the nonaqueous electrolytic solution for 1 hour or greater, the positive electrode which had been cut into a piece of 65 mm×20 mm and immersed in the nonaqueous electrolytic solution for 1 minute or greater, a Capton film, and a silicone rubber of about 4 mm thick were prepared. They were stacked in this order over a ceramic plate connected to a thermocouple. The stacked body thus obtained was placed on a hot plate and heated at a rate of 15° C./min under pressure of 4.1 MPa with a hydraulic press. The change of impedance between the positive and negative electrodes was measured up to 200° C. under an alternating voltage of 1V and frequency of 1 kHz.

The temperature at which the impedance reached 1000Ω was determined to be a shutdown temperature and the temperature at which the impedance fell below 1000Ω again after shutdown was determined to be a short-circuit temperature.

(5) Evaluation of Suitability as Battery Separator a. Preparation of Positive Electrode A positive electrode prepared in the same way as (4) a was punched out into a circular piece having an area of 2.00 cm$^2$.

b. Preparation of Negative Electrode

A negative electrode prepared in the same way as (4) b was punched out into a circular piece having an area of 2.05 cm$^2$.

c. Nonaqueous Electrolytic Solution

A nonaqueous electrolytic solution was prepared by dissolving, in a mixed solvent of ethylene carbonate:ethyl methyl carbonate=1:2 (volume ratio), LiPF$_6$ as a solute to give its concentration of 1.0 ml/L.

d. Assembly of Battery

The negative electrode, the multilayer porous film, and the positive electrode were stacked in this order so that the active material sides of the positive electrode and the negative electrode are facing each other. The resulting stacked body was housed in a container made of a stainless metal and having a lid, which container was insulated between the container body and the lid, in such a manner that the copper foil of the negative electrode and the aluminum foil of the positive electrode were brought into contact with the container body and the lid, respectively. The nonaqueous electrolytic solution was then poured into the container, followed by hermetic sealing.

e. Evaluation (Discharge Rate Characteristics)

The simple battery assembled in d was initially charged at a current of 3 mA (about 0.5 C) to a battery voltage of 4.2V at 25° C. and continued to be charged for totaling about 6 hours in such a manner as to reduce the current from 3 mA while keeping the battery voltage at 4.2V. Then, the battery was discharged at a current of 3 mA to a battery voltage of 3.0V.

Then, the battery was charged at a current of 6 mA (about 1.0 C) to a battery voltage of 4.2V at 25° C. and continued to be charged for totaling about 3 hours in such a manner as to reduce the current from 6 mA while keeping the battery voltage at 4.2V. Then, the battery was discharged at a current of 6 mA to a battery voltage of 3.0V. The discharge capacity at that point was determined to be 10 discharge capacity (mAh).

Then, the battery was charged at a current of 6 mA (about 1.0 C) to a battery voltage of 4.2V at 25° C. and continued to be charged for totaling about 3 hours in such a manner as to reduce the current from 6 mA while keeping the battery voltage at 4.2V. Then, the battery was discharged at a current of 12 mA (about 2.0 C) to a battery voltage of 3.0V. The discharge capacity at that point was determined to be 2 C discharge capacity (mAh).

A ratio of the 2 C discharge capacity to the 10 discharge capacity was calculated and it was determined to be discharge rate characteristics.

Discharge rate characteristics(%)=(2 C discharge capacity/1 C discharge capacity)×100

(Cycle Characteristics)

The simple battery which had been evaluated for discharge rate characteristics was charged at a current of 6 mA (about 1.0 C) to a battery voltage of 4.2V at 60° C. and continued to be charged for totaling about 3 hours in such a manner as to reduce the current from 6 mA while keeping the battery voltage at 4.2V. Then, the battery was discharged at a current of 6 mA to a battery voltage of 3.0V. The above-described charge/discharge cycle was repeated 100 times and the discharge capacity at the first cycle and that at the 100-th cycle were measured.

A ratio of the discharge capacity at the 100-th cycle to the discharge capacity at the first cycle was calculated and it was determined to be cycle characteristics.

Cycle characteristics(%)=(discharge capacity at the 100-th cycle/discharge capacity at the first cycle)×100

(6) Average Particle Diameter and Particle Diameter Distribution of Inorganic Filler An inorganic filler was added in distilled water. After addition of a small amount of an aqueous sodium hexametaphosphate solution, the resulting mixture was dispersed for one minute in an ultrasonic homogenizer. The particle diameter distribution of the resulting dispersion was measured using a laser type particle diameter distribution analyzer ("Microtrac MT3300EX", product of Nikkiso Co., Ltd.). The particle diameter at which the cumulative frequency of the number of particles became 50% was determined to be an average particle diameter.

(7) 150° C. Heat Shrinkage Ratio (%) of (Multilayer) Porous Film 100 mm in MD direction and 100 mm in TD direction was cut from the (multilayer) porous film and the resulting sample was left to stand in an oven of 150° C. for one hour. During heating, the sample was sandwiched between two sheets of paper so as to prevent direct contact of hot air with the sample. After the sample was taken out from the oven and cooled, the length (mm) of it was measured and heat shrinkage ratios in MD and TD were calculated from the following equations, respectively.

MD heat shrinkage ratio(%)={(100−(length in MD after heating))/100}×100

TD heat shrinkage ratio(%)={(100−(length in TD after heating))/100}×100

EXAMPLE 1-1

Preparation of Porous Film

95 Parts by mass of a polyethylene homopolymer having a viscosity-average molecular weight (Mv) of 200000, 5 parts by mass of a polypropylene homopolymer having Mv of 400000, 60 parts by mass of liquid paraffin (dynamic viscosity at 37.78° C.: 7.59×10$^{-5}$ m$^2$/s) as a plasticizer, and 1 part by mass of pentaerythrityl-tetrakis-[3-(3,5-di-t-butyl-4-hydroxyphenyl)propionate] as an antioxidant were prepared. They were premixed in Henschel mixer.

The resulting mixture comprising the polymers and so on was supplied to a feed port of a co-rotating twin-screw extruder in order to melt and knead it. Further, liquid paraffin was side-fed to the cylinder of the co-rating twin-screw extruder so that a mass ratio of the liquid paraffin in the whole mixture to be melt kneaded and extruded became 50 mass %. The melt kneading was conducted under the conditions of a preset temperature of 200° C., a screw rotation speed of 200 rpm, and a discharge rate of 15 kg/h.

Then, the melt kneaded product was extruded through a T-die into between cooling rolls controlled to have a surface temperature of 25° C. to obtain a sheet-like product having a thickness of 1050 μm.

The sheet-like product was then continuously introduced into a simultaneous biaxial tenter drawing machine, in which the sheet was subjected to simultaneous biaxial drawing 7 times in MD direction and 6.4 times in TD direction to obtain a drawn film. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying.

Further, the drawn film was introduced into a TD tenter heat fixing machine and heat fixed. The heat fixing was performed under the following conditions: maximum draw ratio of 1.5, final draw ratio of 1.3, preset temperature during maximum drawing of 123° C., and preset temperature during final drawing of 128° C. As a result, a porous film having a thickness of 16 μm, porosity of 45 vol. %, and air permeability of 235 sec/100 cc was obtained.

(Formation of Porous Layer)

A coating solution was prepared by uniformly dispersing 5 parts by mass of polyvinyl alcohol (average polymerization degree: 1700, saponification degree: 99% or greater) and 95 parts by mass of alumina particles (average particle diameter: 0.7 μm) in 150 parts by mass of water. The resulting coating solution was applied on the surface of the above-described porous film by using a gravure coater. Water was then removed by drying at 60° C. to obtain a multilayer porous film having a porous layer of 2 μm thick formed on the porous film.

Example 1-2

In the same manner as that employed in Example 1-1 except that a styrene butadiene copolymer was used as a binder of the porous layer and the thickness of the porous layer was changed to 7 μm, a multilayer porous film was obtained.

Example 1-3

Preparation of Porous Film 47.5 Parts by mass of a polyethylene homopolymer having Mv of 700000, 47.5 parts by mass of a polyethylene homopolymer having Mv of 250000, and 5 parts by mass of a polypropylene homopolymer having Mv of 400000 were dry blended in a tumbler blender. To 99 parts by mass of the pure polymer mixture thus obtained was added 1 part by mass of pentaerythrityl-tetrakis-[3-(3,5-di-t-butyl-4-hydroxyphenyl)propionate] as an antioxidant, followed by dry blending again in a tumbler blender to obtain a mixture comprising polymers and so on.

After purging with nitrogen, the resulting mixture comprising polymers and so on was supplied to a twin-screw extruder by using a feeder under nitrogen atmosphere. Further, liquid paraffin (dynamic viscosity at 37.78° C.: $7.59 \times 10^{-5}$ m$^2$/s) was poured into the cylinder of the extruder by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die on a cooling roll controlled to have a surface temperature of 25° C. to obtain a sheet-like product having a thickness of 1300 μm.

The sheet-like product was then introduced into a simultaneous biaxial tenter drawing machine, in which the sheet was subjected to simultaneous biaxial drawing 7 times in MD and 6.4 times in TD to obtain a drawn film. At the time of drawing, the preset temperature of the simultaneous biaxial tenter was 118° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 122° C. and TD relax ratio was 0.80. As a result, a porous film having a thickness of 16 μm, porosity of 49 vol. %, and air permeability of 165 sec/100 cc was obtained.

(Formation of Porous Layer)

A coating solution was prepared by uniformly dispersing 5 parts by mass of polyvinyl alcohol (average polymerization degree: 1700, saponification degree: 99% or greater) and 95 parts by mass of titania particles (average particle diameter: 0.4 μm) in 150 parts by mass of water. The resulting coating solution was applied on the surface of the above-described porous film by using a small-diameter gravure coater. Water was then removed by drying at 60° C. to obtain a multilayer porous film having a porous layer of 3 μm thick formed on the porous film.

Example 1-4

In the same manner as that employed in Example 1-3 except that alumina particles used in Example 1-1 were used as the inorganic filler of the porous layer and the thickness of the porous layer was changed to 6 μm, a multilayer porous film was obtained.

Example 1-5

In the same manner as that employed in Example 1-3 except that the thickness of the sheet-like product obtained by extrusion and to be used for the preparation of the porous film was changed to 1000 μm and the thickness, porosity, and air permeability of the porous film were changed to 12 μm, 36 vol. %, and 230 sec/100 cc, respectively, a multilayer porous film was obtained.

Example 1-6

In the same manner as that employed in Example 1-5 except that alumina particles (average particle diameter: 2.0 μm) were used as the inorganic filler of the porous layer and the thickness of the porous layer was changed to 8 μm, a multilayer porous film was obtained.

Example 1-7

In the same manner as that employed in Example 1-3 except that 46 parts by mass of a polyethylene homopolymer having Mv of 300000, 47 parts by mass of a polyethylene homopolymer having Mv of 700000, and 7 parts by mass of polypropylene having Mv of 400000 were used as the polyolefin of the porous film, the thickness of the sheet-like product obtained by extrusion and to be used for the preparation of the porous film was changed to 1700 μm, the thickness, porosity, and air permeability of the porous film were changed to 20 μm, 40 vol. %, and 280 sec/100 cc, respectively, and the thickness of the porous layer was changed to 2 μm, a multilayer porous film was prepared.

Example 1-8

In the same manner as that employed in Example 1-7 except that the thickness of the porous layer was changed to 8 µm, a multilayer porous film was obtained.

Example 1-9

In the same manner as that employed in Example 1-7 except that the thickness, porosity, and air permeability of the porous film were changed to 16 µm, 41 vol. %, and 160 sec/100 cc, respectively, and the thickness of the porous layer was changed to 3 µm, a multilayer porous film was obtained.

Example 1-10

In the same manner as that employed in Example 1-7 except that the thickness, porosity, and air permeability of the porous film were changed to 25 µm, 42 vol. %, and 300 sec/100 cc, respectively, and the thickness of the porous layer was changed to 4 µm, a multilayer porous film was obtained.

Example 1-11

In the same manner as that employed in Example 1-1 except that a porous film having a porosity of 43 vol. % and air permeability of 190 sec/100 cc was obtained using a polyethylene homopolymer having Mv of 700000 instead of the polyethylene homopolymer having Mv of 200000, and a small-diameter gravure coater was used for application of the coating solution to the surface of the porous film, a multilayer porous film was obtained.

Example 1-12

In the same manner as that employed in Example 1-11 except that a porous film having an air permeability of 170 sec/100 cc was obtained using 99 parts by mass of a polyethylene homopolymer having Mv of 700000 and 1 part by mass of a polypropylene homopolymer having Mv of 400000; and the thickness of the porous layer was changed to 4 µm, a multilayer porous film was obtained.

Example 1-13

In the same manner as that employed in Example 1-11 except that a porous film having an air permeability of 250 sec/100 cc was obtained using 90 parts by mass of a polyethylene homopolymer having Mv of 700000 and 10 parts by mass of a polypropylene homopolymer having Mv of 400000; and the thickness of the porous layer was changed to 3 µm, a multilayer porous film was obtained.

Example 1-14

In the same manner as that employed in Example 1-11 except that a porous film having a thickness of 18 µm and air permeability of 360 sec/100 cc was obtained using 70 parts by mass of a polyethylene homopolymer having Mv of 700000 and 30 parts by mass a polypropylene homopolymer having Mv of 400000, a multilayer porous film was obtained.

Comparative Example 1-15

In the same manner as that employed in Example 1-11 except that a porous film having a thickness of 18 µm and air permeability of 400 sec/100 cc was obtained using 60 parts by mass of a polyethylene homopolymer having Mv of 700000 and 40 parts by mass of a polypropylene homopolymer having Mv of 400000, a multilayer porous film was obtained.

Comparative Example 1-1

In the same manner as that employed in Example 1-1 except that a porous film having a thickness of 20 µm, porosity of 41 vol. %, and air permeability of 260 sec/100 cc was obtained using 100 parts by mass of a polyethylene homopolymer having Mv of 200000 as the polyolefin of the porous film and changing the thickness of the sheet-like product obtained by extrusion to 1300 µm; and the thickness of the porous layer was changed to 3 µm, a multilayer porous film was obtained.

Comparative Example 1-2

In the same manner as that employed in Comparative Example 1-1 except that the thickness of the porous layer was changed to 8 µm, a multilayer porous film was obtained.

Comparative Example 1-3

In the same manner as that employed in Example 3 except that a porous film having a thickness of 24 µm, porosity of 40 vol. %, and air permeability of 510 sec/100 cc was obtained using 43 parts by mass of a polyethylene homopolymer having Mv of 300000, 43 parts by mass of a polyethylene homopolymer having Mv of 700000, and 14 parts by mass of a polyethylene homopolymer having Mv of 400000 and changing the thickness of the sheet-like product obtained by extrusion to 1550 µm; and alumina was used as the inorganic filler of the porous layer, a multilayer porous film was obtained.

Comparative Example 1-4

In the same manner as that employed in Comparative Example 1-3 except that the thickness of the porous layer was changed to 10 µm, a multilayer porous film was obtained.

Comparative Example 1-5

In the same manner as that employed in Example 1-1 or 1-2 except that the porous layer was not formed, a porous film was obtained.

Comparative Example 1-6

In the same manner as that employed in Example 1-3 or 1-4 except that the porous layer was not formed, a porous film was obtained.

Comparative Example 1-7

In the same manner as that employed in Example 1-5 or 1-6 except that the porous layer was not formed, a porous film was obtained.

Comparative Example 1-8

In the same manner as that employed in Example 1-7 or 1-8 except that the porous layer was not formed, a porous film was obtained.

Comparative Example 1-9

In the same manner as that employed in Comparative Example 1-1 or 1-2 except that the porous layer was not formed, a porous film was obtained.

Comparative Example 1-10

In the same manner as that employed in Comparative Example 1-3 or 1-4 except that the porous layer was not formed, a porous film was obtained.

Comparative Example 1-11

In the same manner as that employed in Example 1-1 except that a porous film having a thickness of 16 μm, porosity of 43 vol. %, and air permeability of 170 sec/100 cc was obtained using 100 parts by mass of a polyethylene homopolymer having Mv of 700000 as the polyolefin of the porous film and changing the thickness of the sheet-like product obtained by extrusion to 1000 μm; a small-diameter gravure coater was used for application of a coating solution to the surface of the porous film; and the thickness of the porous layer was changed to 8 μm, a multilayer porous film was obtained.

Comparative Example 1-12

In the same manner as that employed in Example 1-9 except that the porous layer was not formed, a porous film was obtained.

Comparative Example 1-13

In the same manner as that employed in Example 1-10 except that the porous layer was not formed, a porous film was obtained.

Comparative Example 1-14

In the same manner as that employed in Comparative Example 1-11 except that the porous layer was not formed, a porous film was obtained.

Comparative Example 1-15

In the same manner as that employed in Example 1-12 except that the porous layer was not formed, a porous film was obtained.

Comparative Example 1-16

In the same manner as that employed in Example 1-11 except that the porous layer was not formed, a porous film was obtained.

Comparative Example 1-17

In the same manner as that employed in Example 1-13 except that the porous layer was not formed, a porous film was obtained.

Comparative Example 1-18

In the same manner as that employed in Example 1-14 except that the porous layer was not formed, a porous film was obtained.

Comparative Example 1-19

In the same manner as that employed in Example 1-15 except that the porous layer was not formed, a porous film was obtained.

The air permeability, suitability as battery separator, shutdown temperature, and short-circuit temperature of the multilayer porous films prepared in Examples 1-1 to 1-15 and Comparative Examples 1-1 to 1-4 and 1-11, and the porous films prepared in Comparative Examples 1-5 to 1-10, 1-12 to 1-19 and 1-20 are shown in Table 1.

Simple batteries using the multilayer porous films or porous films obtained in Examples 1-1 to 1-15 and Comparative Examples 1-1 to 1-19 each showed discharge rate characteristics and cycle characteristics of 90% or greater. It can be confirmed from the results that the multilayer porous films or porous films prepared in Examples 1 to 15 and Comparative Examples 1 to 19 are usable as a battery separator.

In particular, the multilayer porous films or porous films obtained in Examples 1-1 to 1-14 and Comparative Examples 1-1 to 1-18 which had a small polypropylene ratio relative to all the polyolefins in the resin composition constituting the porous film had a shutdown temperature of from 144 to 152° C. and thus had a very good shutdown function.

However, the multilayer porous films obtained in Comparative Examples 1-1 to 1-4 and 1-11 using a polypropylene-free porous film or the porous films obtained in Comparative Examples 1-5 to 1-10 and 1-12 to 1-18 having no inorganic filler-containing layer stacked thereon caused short circuit only by heating to shutdown temperature+several ° C. and some of them caused short circuit below 200° C. They were thus inferior in heat resistance.

On the other hand, the multilayer porous films obtained in Examples 1 to 15 having a polypropylene-containing porous film and having an inorganic filler-containing layer did not cause short circuit even by heating to 200° C. and thus were excellent in heat resistance.

TABLE 1

| | Porous film | | | | | |
|---|---|---|---|---|---|---|
| | Composition of polyolefin resin composition (parts by mass) | | | | | |
| | | PE | | | | Air |
| | PP Mv 400000 | Mv 200000 to 300000 | Mv 400000 | Mv 700000 | Film thickness (μm) | permeability (sec/100 cc) |
| Ex. 1-1 | 5 | 95 | 0 | 0 | 16 | 235 |
| Ex. 1-2 | 5 | 95 | 0 | 0 | 16 | 235 |
| Ex. 1-3 | 5 | 47.5 | 0 | 47.5 | 16 | 165 |
| Ex. 1-4 | 5 | 47.5 | 0 | 47.5 | 16 | 165 |
| Ex. 1-5 | 5 | 47.5 | 0 | 47.5 | 12 | 230 |
| Ex. 1-6 | 5 | 47.5 | 0 | 47.5 | 12 | 230 |
| Ex. 1-7 | 7 | 46 | 0 | 47 | 20 | 280 |
| Ex. 1-8 | 7 | 46 | 0 | 47 | 20 | 280 |
| Ex. 1-9 | 7 | 46 | 0 | 47 | 16 | 160 |
| Ex. 1-10 | 7 | 46 | 0 | 47 | 25 | 300 |
| Ex. 1-11 | 5 | 0 | 0 | 95 | 16 | 190 |
| Ex. 1-12 | 1 | 0 | 0 | 99 | 16 | 170 |
| Ex. 1-13 | 10 | 0 | 0 | 90 | 16 | 250 |
| Ex. 1-14 | 30 | 0 | 0 | 70 | 18 | 360 |
| Ex. 1-15 | 40 | 0 | 0 | 60 | 18 | 400 |
| Comp. Ex. 1-1 | 0 | 100 | 0 | 0 | 20 | 260 |
| Comp. Ex. 1-2 | 0 | 100 | 0 | 0 | 20 | 260 |
| Comp. Ex. 1-3 | 0 | 43 | 14 | 43 | 24 | 510 |
| Comp. Ex. 1-4 | 0 | 43 | 14 | 43 | 24 | 510 |
| Comp. Ex. 1-5 | 5 | 95 | 0 | 0 | 16 | 235 |
| Comp. Ex. 1-6 | 5 | 47.5 | 0 | 47.5 | 16 | 165 |
| Comp. Ex. 1-7 | 5 | 47.5 | 0 | 47.5 | 12 | 230 |
| Comp. Ex. 1-8 | 7 | 46 | 0 | 47 | 20 | 280 |
| Comp. Ex. 1-9 | 0 | 100 | 0 | 0 | 20 | 260 |
| Comp. Ex. 1-10 | 0 | 43 | 14 | 43 | 24 | 510 |
| Comp. Ex. 1-11 | 0 | 0 | 0 | 100 | 16 | 170 |
| Comp. Ex. 1-12 | 7 | 46 | 0 | 47 | 16 | 160 |
| Comp. Ex. 1-13 | 7 | 46 | 0 | 47 | 25 | 300 |
| Comp. Ex. 1-14 | 0 | 0 | 0 | 100 | 16 | 170 |
| Comp. Ex. 1-15 | 1 | 0 | 0 | 99 | 16 | 170 |
| Comp. Ex. 1-16 | 5 | 0 | 0 | 95 | 16 | 190 |
| Comp. Ex. 1-17 | 10 | 0 | 0 | 90 | 16 | 250 |
| Comp. Ex. 1-18 | 30 | 0 | 0 | 70 | 18 | 360 |
| Comp. Ex. 1-19 | 40 | 0 | 0 | 60 | 18 | 400 |

| | Porous layer | | | Multilayer porous film | | | |
|---|---|---|---|---|---|---|---|
| | Binder | Inorganic filler | Layer thickness (μm) | Air permeability (sec/100 cc) | Air permeability increase(%) | Shutdown Temperature (° C.) | Short-circuit temperature (° C.) |
| Ex. 1-1 | PVA | Alumina | 2 | 255 | 9 | 146 | >200 |
| Ex. 1-2 | SB | Alumina | 7 | 280 | 19 | 145 | >200 |
| Ex. 1-3 | PVA | Titania | 3 | 205 | 24 | 148 | >200 |
| Ex. 1-4 | PVA | Alumina | 6 | 220 | 33 | 148 | >200 |
| Ex. 1-5 | PVA | Titania | 3 | 270 | 17 | 150 | >200 |
| Ex. 1-6 | PVA | Alumina | 8 | 340 | 48 | 147 | >200 |
| Ex. 1-7 | PVA | Titania | 2 | 310 | 11 | 148 | >200 |
| Ex. 1-8 | PVA | Titania | 8 | 330 | 18 | 147 | >200 |
| Ex. 1-9 | PVA | Alumina | 3 | 170 | 6 | 146 | >200 |
| Ex. 1-10 | PVA | Alumina | 4 | 320 | 7 | 147 | >200 |
| Ex. 1-11 | PVA | Alumina | 2 | 210 | 11 | 147 | >200 |
| Ex. 1-12 | PVA | Alumina | 4 | 185 | 9 | 148 | >200 |
| Ex. 1-13 | PVA | Alumina | 3 | 300 | 20 | 149 | >200 |
| Ex. 1-14 | PVA | Alumina | 2 | 420 | 17 | 151 | >200 |
| Ex. 1-15 | PVA | Alumina | 2 | 480 | 20 | 161 | >200 |
| Comp. Ex. 1-1 | PVA | Alumina | 3 | 300 | 15 | 144 | 148 |
| Comp. Ex. 1-2 | PVA | Alumina | 8 | 315 | 21 | 146 | 149 |
| Comp. Ex. 1-3 | PVA | Alumina | 3 | 533 | 5 | 145 | 150 |
| Comp. Ex. 1-4 | PVA | Alumina | 10 | 580 | 14 | 146 | 152 |
| Comp. Ex. 1-5 | — | — | 0 | 235 | 0 | 147 | 148 |
| Comp. Ex. 1-6 | — | — | 0 | 165 | 0 | 145 | 154 |
| Comp. Ex. 1-7 | — | — | 0 | 230 | 0 | 146 | 153 |
| Comp. Ex. 1-8 | — | — | 0 | 280 | 0 | 149 | 153 |
| Comp. Ex. 1-9 | — | — | 0 | 260 | 0 | 145 | 148 |
| Comp. Ex. 1-10 | — | — | 0 | 510 | 0 | 147 | 150 |
| Comp. Ex. 1-11 | PVA | Alumina | 8 | 210 | 24 | 147 | 156 |
| Comp. Ex. 1-12 | — | — | 0 | 160 | 0 | 145 | 156 |
| Comp. Ex. 1-13 | — | — | 0 | 300 | 0 | 148 | 154 |
| Comp. Ex. 1-14 | — | — | 0 | 170 | 0 | 146 | 149 |

TABLE 1-continued

| | | | | | | |
|---|---|---|---|---|---|---|
| Comp. Ex. 1-15 | — | — | 0 | 170 | 0 | 147 | 150 |
| Comp. Ex. 1-16 | — | — | 0 | 190 | 0 | 147 | 151 |
| Comp. Ex. 1-17 | — | — | 0 | 250 | 0 | 148 | 156 |
| Comp. Ex. 1-18 | — | — | 0 | 380 | 6 | 152 | 193 |
| Comp. Ex. 1-19 | — | — | 0 | 400 | 0 | 161 | >200 |

Example 2-1

Preparation of Porous Film 47.5 Parts by mass of a polyethylene homopolymer having Mv of 700000, 47.5 parts by mass of a polyethylene homopolymer having Mv of 250000, and 5 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl) propionate] as an antioxidant, followed by dry blending again in a tumbler blender to obtain a mixture comprising polymers and so on. After purging with nitrogen, the resulting mixture comprising polymers and so on was supplied to a twin-screw extruder by using a feeder under nitrogen atmosphere. Further, liquid paraffin (dynamic viscosity at 37.78° C.: 7.59× $10^{-5}$ m$^2$/s) was poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C., whereby a polyolefin composition in sheet form having a thickness of 1300 μm was obtained.

The resulting polyolefin composition sheet was then introduced into a simultaneous biaxial tenter drawing machine, in which the sheet was subjected to simultaneous biaxial drawing 7 times in MD direction and 6.4 times in TD direction. At the time of drawing, the present temperature of the simultaneous biaxial tenter was 118° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 122° C. and TD relax ratio was 0.80. As a result, a polyolefin resin composition porous film having a thickness of 16 μm, porosity of 49%, and air permeability of 155 sec/100 cc was obtained.

(Formation of Porous Layer)

A coating solution was prepared by uniformly dispersing 98.2 parts by mass of α-alumina particles which had an average particle diameter of 0.56 μm and 86% or greater, based on the total number of the particles, of which had a particle diameter of 0.4 μm or greater but not greater than 1.5 μm and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 5 μm thick formed on the polyolefin resin composition porous film.

Example 2-2

In the same manner as that employed in Example 2-1 except that α-alumina particles which had an average particle diameter of 0.80 μm and 69% or greater, based on the total number of the particles, of which had a particle diameter of 0.4 micron or greater but not greater than 1.5 μm were used, a multilayer porous film was obtained.

Example 2-3

In the same manner as that employed in Example 2-1 except that α-alumina particles which had an average particle diameter of 1.15 μm and 68% or greater, based on the total number of the particles, of which had a particle diameter of 0.4 μm or greater but not greater than 1.5 μm were used and the thickness of the porous layer was changed to 6 μm, a multilayer porous film was obtained.

Example 2-4

Preparation of Porous Film 47 parts by mass of a polyethylene homopolymer having Mv of 700000, 46 parts by mass of a polyethylene homopolymer having Mv of 250000, and 7 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl)propionate] as an antioxidant, followed by dry blending again in a tumbler blender to obtain a mixture comprising polymers and so on. After purging with nitrogen, the resulting mixture comprising polymers and so on was supplied to a twin-screw extruder by using a feeder under nitrogen atmosphere. Further, liquid paraffin (dynamic viscosity at 37.78° C.: 7.59×$10^{-5}$ m$^2$/s) was poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C. to obtain a polyolefin composition in sheet form having a thickness of 2000 μm.

The resulting polyolefin composition sheet was then introduced into a simultaneous biaxial tenter drawing machine, in which the sheet was subjected to simultaneous biaxial drawing 7 times in MD direction and 7 times in TD direction. During drawing, the preset temperature of the simultaneous biaxial tenter was 125° C. Then, the drawn film thus obtained was introduced into a methyl ethyl ketone tank to extract and remove the liquid paraffin. Then, methyl ethyl ketone was removed by drying. Further, the drawn film was introduced into a TD tenter heat fixing machine and heat fixed. The heat fixing temperature was 133° C. and TD relax ratio was 0.80.

As a result, a polyolefin resin composition porous film having a thickness of 16 μm, porosity of 40%, and air permeability of 165 sec/100 cc was obtained.

(Formation of Porous Layer)

A coating solution was prepared by uniformly dispersing 98.2 parts by mass of α-alumina particles which had an average particle diameter of 0.80 μm and 69% or greater, based on the total number of the particles, of which had a particle diameter of 0.4 μm or greater but not greater than 1.5 μm and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 4 μm thick formed on the polyolefin resin composition porous film.

Example 2-5

47.5 Parts by mass of a polyethylene having a viscosity-average molecular weight (Mv) of 200000, 2.5 parts by mass of a polypropylene having Mv of 400000, 30 parts by mass of liquid paraffin (LP) as a plasticizer, and 0.5 part by mass of pentaerythrityl-tetrakis-[3-(3,5-di-t-butyl-4-hydroxyphenyl) propionate] as an antioxidant were premixed in a Henschel mixer. The resulting mixture was supplied to the feed port of a co-rotating twin-screw extruder by using a feeder. On the other hand, liquid paraffin was side-fed to the cylinder of the twin-screw extruder so that the mass ratio of the liquid paraffin in the whole mixture (100 parts by mass) to be melt-kneaded and extruded became 50 parts by mass. The melt kneading was conducted under the conditions of a preset temperature of 200° C., a screw rotation speed of 200 rpm, and a discharge rate of 15 kg/h. Then, the melt kneaded product was extruded through a T-die into between cooling rolls controlled to have a surface temperature of 25° C. to obtain a polyolefin composition in sheet form having a thickness of 1050 μm. The resulting polyolefin composition sheet was then introduced continuously into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying. Further, the drawn film was introduced into a TD tenter heat fixing machine and heat fixed. The heat fixing was conducted under the following conditions: maximum draw ratio of 1.5, final draw ratio of 1.3, preset temperature upon maximum drawing of 123° C., and preset temperature upon final drawing of 128° C. As a result, a polyolefin resin composition porous film having a thickness of 16 μm, porosity of 45%, and air permeability of 235 sec/100 cc was obtained.

(Formation of Porous Layer)

A coating solution was prepared by uniformly dispersing 98.2 parts by mass of α-alumina particles which had an average particle diameter of 0.80 μm and 69% or greater, based on the total number of particles, of which had a particle diameter of 0.4 μm or greater but not greater than 1.5 μm and 1.8 parts by mass of polyvinyl alcohol (average polymerization degree: 1700, saponification degree: 99% or greater) in 150 parts by mass of water. The resulting coating solution was applied on the surface of the above-described polyolefin resin composition porous film by using a gravure coater. Water was then removed by drying at 60° C. to obtain a multilayer porous film having a porous layer of 3 μm thick formed on the polyolefin resin porous film.

Example 2-6

Preparation of Porous Film 16.6 Parts by mass of a polyethylene having a viscosity-average molecular weight (Mv) of 700000, 16.6 parts by mass of a polyethylene having Mv of 250000, 1.8 parts by mass of a polypropylene having Mv of 400000, 40 parts by mass of liquid paraffin (LP) as a plasticizer, and 0.3 part by mass of pentaerythrityl-tetrakis-[3-(3,5-di-t-butyl-4-hydroxyphenyl) propionate] as an antioxidant were premixed in a Henschel mixer. The resulting mixture was supplied to the feed port of a co-rotating twin-screw extruder by using a feeder. Further, liquid paraffin was side-fed to the cylinder of the twin-screw extruder so that the mass ratio of the liquid paraffin in the whole mixture (100 parts by mass) to be melt-kneaded and extruded became 65 parts by mass. The melt kneading was conducted under the conditions of a preset temperature of 200° C., a screw rotation speed of 240 rpm, and a discharge rate of 12 kg/h. Then, the melt kneaded product was extruded through a T-die into between cooling rolls controlled to have a surface temperature of 25° C. to obtain a polyolefin composition in sheet form having a thickness of 1000 μm. The resulting polyolefin composition was then introduced continuously into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to remove the plasticizer, followed by removal of methyl ethyl ketone by drying. Further, the drawn film was introduced into a TD tenter heat fixing machine and heat fixed. The heat fixing temperature was 130° C. and TD relax ratio was 0.80. As a result, a polyolefin resin composition porous film having a thickness of 12 μm, porosity of 36%, and air permeability of 235 sec/100 cc was obtained.

(Formation of Porous Layer)

A coating solution was prepared by uniformly dispersing 98.2 parts by mass of α-alumina particles which had an average particle diameter of 0.80 μm and 69% or greater, based on the total number of particles, of which had a particle diameter of 0.4 μm or greater but not greater than 1.5 μm and 1.8 parts by mass of polyvinyl alcohol (average polymerization degree: 1700, saponification degree: 99% or greater) in 150 parts by mass of water. The resulting coating solution was applied on the surface of the above-described polyolefin resin composition porous film by using a gravure coater. Water was then removed by drying at 60° C. to obtain a multilayer porous film having a porous layer of 6 μm thick formed on the polyolefin resin composition porous film.

Example for Comparison 2-1

In the same manner as that employed in Example 2-1 except that a coating solution was prepared by uniformly dispersing 92.8 parts by mass of α-alumina particles having an average particle diameter of 0.09 μm and 7.2 parts by mass of polyvinyl alcohol (average polymerization degree of 1700, saponification degree of 99% or greater) in 150 parts by mass of water and a porous layer having a thickness of 8 μm was formed on the polyolefin resin composition porous film, a multilayer porous film was obtained.

Example for Comparison 2-2

In the same manner as that employed in Example 2-1 except that α-alumina particles having an average particle diameter of 0.20 μm were used and the thickness of the porous layer was changed to 10 μm, a multilayer porous film was obtained.

Example for Comparison 2-3

In the same manner as that employed in Example 2-1 except that a coating solution was prepared by uniformly dispersing 96.4 parts by mass of α-alumina particles having an average particle diameter of 0.33 μm and 3.6 parts by mass of polyvinyl alcohol (average polymerization degree of 1700, saponification degree of 99% or greater) in 150 parts by mass of water and a porous layer of 7 μm thick was formed on the polyolefin resin composition porous film, a multilayer porous film was obtained.

Example for Comparison 2-4

In the same manner as that employed in Example 2-1 except that α-alumina particles having an average particle diameter of 0.41 μm were used and the thickness of the porous layer was changed to 8 μm, a multilayer porous film was obtained.

Example for Comparison 2-5

In the same manner as that employed in Example 2-1 except that α-alumina particles having an average particle diameter of 1.47 μm were used and the thickness of the porous layer was changed to 6 μm, a multilayer porous film was obtained.

Example for Comparison 2-6

In the same manner as that employed in Example 2-1 except that ix-alumina particles having an average particle diameter of 2.33 μm were used and the thickness of the porous layer was changed to 6 μm, a multilayer porous film was obtained.

Example for Comparison 2-7

In the same manner as that employed in Example 2-1 except that α-alumina particles having an average particle diameter of 2.51 μm were used and the thickness of the porous layer was changed to 7 μm, a multilayer porous film was obtained.

Example for Comparison 2-8

In the same manner as that employed in Example 2-1 except that α-alumina particles having an average particle diameter of 3.57 μm were used and the thickness of the porous layer was changed to 8 μm, a multilayer porous film was obtained.

Example for Comparison 2-9

In the same manner as that employed in Example 2-4 except that α-alumina particles having an average particle diameter of 0.33 μm were used and the thickness of the porous layer was changed to 8 μm, a multilayer porous film was obtained.

Example for Comparison 2-10

In the same manner as that employed in Example 2-4 except that α-alumina particles having an average particle diameter of 1.47 μm were used and the thickness of the porous layer was changed to 6 μm, a multilayer porous film was obtained.

Example for Comparison 2-11

In the same manner as that employed in Example 2-5 except that α-alumina particles having an average particle diameter of 0.20 μm were used and the thickness of the porous layer was changed to 7 μm, a multilayer porous film was obtained.

Example for Comparison 2-12

In the same manner as that employed in Example 2-5 except that α-alumina particles having an average particle diameter of 1.47 μm were used and the thickness of the porous layer was changed to 7 μm, a multilayer porous film was obtained.

Example for Comparison 2-13

In the same manner as that employed in Example 2-6 except that α-alumina particles having an average particle diameter of 0.33 μm were used and the thickness of the porous layer was changed to 8 μm, a multilayer porous film was obtained.

Comparative Example 2-14

In the same manner as that employed in Example 2-1 except that the porous layer was not formed, a porous film was obtained.

Comparative Example 2-15

In the same manner as that employed in Example 2-4 except that the porous layer was not formed, a porous film was obtained.

Comparative Example 2-16

In the same manner as that employed in Example 2-5 except that the porous layer was not formed, a porous film was obtained.

Comparative Example 2-17

In the same manner as that employed in Example 2-6 except that the porous layer was not formed, a porous film was obtained.

The air permeability, 150° C. heat shrinkage ratio, shutdown temperature, and short-circuit temperature of each of the multilayer porous films obtained in Examples 2-1 to 2-6, Examples for Comparison 2-1 to 2-13, and Comparative Examples 2-14 to 2-17 are shown in Table 2.

The porous films obtained in Comparative Examples 2-14 to 2-17 having no porous layer showed a very high heat shrinkage ratio at 150° C. exceeding 50%.

On the other hand, the multilayer porous films of Examples for Comparison 2-1 to 2-13 having a porous layer formed with alumina having an average particle diameter of 0.5 μm or less or 1.2 μm or greater had a reduced heat shrinkage ratio at 150° C. compared with the porous films obtained in Comparative Examples 2-14 to 2-17 having no alumina porous layer. However, their heat shrinkage ratio was 40% or greater in MD direction and 15% or greater in TD direction even when they had a porous layer having a thickness of 6 μm or greater.

On the other hand, the multilayer porous films of Examples 1 to 6 having a porous layer formed with alumina having an average particle diameter of 0.5 μm or greater but not greater than 1.2 μm showed a heat shrinkage ratio at 150° C. of 5% or less in each of MD direction and TD direction though the thickness of the alumina porous layer was as thin as from 3 to 6 μm. Thus, they showed good heat-shrinkage resistance characteristics.

The air permeability of each of the multilayer porous films obtained in Examples 2-1 to 2-6 and Examples for Comparison 2-1 to 2-13 was as small as 300 sec/100 cc or less. In particular, since the alumina porous layers of the multilayer porous films obtained in Examples 2-1 to 2-6 were thin, an air permeability increase % of these films was suppressed to 40% or less and thus smaller even compared with the porous films which had been obtained in Comparative Examples 2-14 to 2-17 with no porous layer formed thereon.

Simple batteries using, as a separator, the multilayer porous films or porous films obtained in Examples 2-1 to 2-6, Examples for Comparison 2-1 to 2-13, and Comparative Examples 2-14 to 2-17 each exhibited discharge rate characteristics and cycle characteristics of 90% or greater. It has been confirmed from these results that the multilayer porous films or porous films obtained in Examples 2-1 to 2-6, Examples for Comparison 2-1 to 2-13, and Comparative Examples 2-14 to 2-17 are usable as a battery separator. Further, these multilayer porous films or porous films had a shutdown temperature of from 144 to 148° C., suggesting that they had a good shutdown function.

The porous films of Comparative Example 2-14 to 2-17 having no alumina porous layer formed thereon caused short circuit only by heating to shutdown temperature+several ° C., but none of the multilayer porous films obtained in Examples 2-1 to 2-6 and Examples for Comparison 2-1 to 2-13 having an alumina porous layer formed thereon caused short circuit even by heating to 180° C. or greater. In particular, the multilayer porous films obtained in Examples 2-1 to 2-6 did not cause short circuit even by heating to 200° C. and thus had excellent heat resistance.

TABLE 2

| | Porous film | | | Porous layer | | Multilayer porous film | | | | | |
|---|---|---|---|---|---|---|---|---|---|---|---|
| | Film thickness (μm) | Porosity (%) | Air permeability (sec/100 cc) | Average particle diameter of alumina (μm) | Layer thickness (μm) | Air permeability (sec/100 cc) | Air permeability increase (%) | 150° C. Heat shrinkage ratio MD (%) | TD (%) | Shutdown temperature (° C.) | Short-circuit temperature (° C.) |
| Ex. 2-1 | 16 | 49 | 155 | 0.56 | 5 | 210 | 35 | 4 | 3 | 145 | >200 |
| Ex. 2-2 | 16 | 49 | 155 | 0.80 | 5 | 180 | 16 | 4 | 1 | 146 | >200 |
| Ex. 2-3 | 16 | 49 | 155 | 1.15 | 6 | 215 | 39 | 5 | 3 | 146 | >200 |
| Ex. 2-4 | 16 | 40 | 165 | 0.80 | 4 | 175 | 6 | 3 | 2 | 146 | >200 |
| Ex. 2-5 | 16 | 45 | 235 | 0.80 | 3 | 250 | 6 | 5 | 3 | 146 | >200 |
| Ex. 2-6 | 12 | 36 | 235 | 0.80 | 6 | 240 | 2 | 1 | 1 | 147 | >200 |
| Comp. Ex. 2-1 | 16 | 49 | 155 | 0.09 | 8 | 200 | 29 | 50 | 20 | 147 | >200 |
| Comp. Ex. 2-2 | 16 | 49 | 155 | 0.20 | 10 | 181 | 17 | 59 | 19 | 146 | >200 |
| Comp. Ex. 2-3 | 16 | 49 | 155 | 0.33 | 7 | 198 | 28 | 56 | 22 | 146 | >200 |
| Comp. Ex. 2-4 | 16 | 49 | 155 | 0.41 | 8 | 186 | 20 | 50 | 16 | 146 | >200 |
| Comp. Ex. 2-5 | 16 | 49 | 155 | 1.47 | 6 | 215 | 39 | 55 | 17 | 145 | >200 |
| Comp. Ex. 2-6 | 16 | 49 | 155 | 2.33 | 6 | 220 | 42 | 59 | 23 | 146 | >200 |
| Comp. Ex. 2-7 | 16 | 49 | 155 | 2.51 | 7 | 245 | 58 | 55 | 22 | 144 | >200 |
| Comp. Ex. 2-8 | 16 | 49 | 155 | 3.57 | 8 | 238 | 54 | 56 | 28 | 146 | >200 |
| Comp. Ex. 2-9 | 16 | 40 | 165 | 0.33 | 8 | 190 | 15 | 40 | 38 | 147 | 183 |
| Comp. Ex. 2-10 | 16 | 40 | 165 | 1.47 | 6 | 295 | 79 | 47 | 45 | 147 | 188 |
| Comp. Ex. 2-11 | 16 | 45 | 235 | 0.20 | 7 | 290 | 23 | 49 | 43 | 146 | >200 |
| Comp. Ex. 2-12 | 16 | 45 | 235 | 1.47 | 7 | 280 | 19 | 42 | 41 | 146 | >200 |
| Comp. Ex. 2-13 | 12 | 36 | 235 | 0.33 | 8 | 280 | 19 | 51 | 40 | 150 | >200 |
| Comp. Ex. 2-14 | 16 | 49 | 155 | — | 0 | 155 | 0 | 73 | 53 | 148 | 152 |
| Comp. Ex. 2-15 | 16 | 40 | 165 | — | 0 | 165 | 0 | 60 | 50 | 145 | 155 |
| Comp. Ex. 2-16 | 16 | 45 | 235 | — | 0 | 235 | 0 | 69 | 67 | 147 | 149 |
| Comp. Ex. 2-17 | 12 | 36 | 235 | — | 0 | 235 | 0 | 57 | 59 | 147 | 153 |

Example 3-1

Preparation of Porous Film 47.5 Parts by mass of a polyethylene homopolymer having Mv of 700000, 47.5 parts by mass of a polyethylene homopolymer having Mv of 250000, and 5 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl) propionate] as an antioxidant, followed by dry blending again in a tumbler blender to obtain a mixture comprising polymers and so on. After purging with nitrogen, the resulting mixture comprising polymers and so on was supplied to a twin-screw extruder by using a feeder under nitrogen atmosphere. Further, liquid paraffin (dynamic viscosity at 37.78° C.: $7.59 \times 10^{-5}$ m$^2$/s) was poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C. to obtain a polyolefin resin composition in sheet form having a thickness of 1300 μm.

The resulting polyolefin resin composition sheet was then introduced into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 122° C. and TD relax ratio was 0.80. As a result, a polyolefin resin composition porous film having a thickness of 16 μm, porosity of 49%, and air permeability of 155 sec/100 cc was obtained.

(Formation of Porous Layer)

A coating solution was prepared by uniformly dispersing 98.2 parts by mass of alumina particles 5 shown in Table 3 and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 5 μm thick formed on the polyolefin resin porous film.

Example 3-2

In the same manner as that employed in Example 3-1 except that alumina particles 6 shown in Table 3 were used and the thickness of the porous layer was changed to 4 μm, a multilayer porous film was obtained.

Example 3-3

In the same manner as that employed in Example 3-1 except that alumina particles 7 shown in Table 3 were used and the thickness of the porous layer was changed to 6 μm, a multilayer porous film was obtained.

Example 3-4

Preparation of Porous Film

47 Parts by mass of a polyethylene homopolymer having Mv of 700000, 46 parts by mass of a polyethylene homopolymer having Mv of 250000, and 7 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl)propionate] as an antioxidant, followed by dry blending again in a tumbler blender to obtain a mixture comprising polymers and so on. After purging with nitrogen, the resulting mixture comprising polymers and the like was supplied to a twin-screw extruder by using a feeder under nitrogen atmosphere. Further, liquid paraffin (dynamic viscosity at 37.78° C.: $7.59 \times 10^{-5}$ m$^2$/s) was poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C. to obtain a polyolefin composition in sheet form having a thickness of 2000 μm.

The resulting polyolefin composition sheet was then introduced into a simultaneous biaxial tenter drawing machine in which the sheet was subjected to simultaneous biaxial drawing 7 times in MD direction and 7 times in TD direction. At the time of drawing, the preset temperature of the simultaneous biaxial tenter was 125° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 133° C. and TD relax ratio was 0.80. As a result, a polyolefin resin composition porous film having a thickness of 16 μm, porosity of 40%, and air permeability of 165 sec/100 cc was obtained.

(Formation of Porous Layer)

A coating solution was prepared by uniformly dispersing 98.2 parts by mass of alumina particles 6 shown in Table 3 and 1.8 parts by mass of polyvinyl alcohol (average polymerization degree: 1700, saponification degree: 99% or greater) in 150 parts by mass of water. The resulting coating solution was applied to the surface of the above-described polyolefin resin porous film by using a gravure coater. Water was then removed by drying at 60° C. to obtain a multilayer porous film having a porous layer of 6 μm thick formed on the polyolefin resin composition porous film.

Example 3-5

Preparation of Porous Film 47.5 Parts by mass of a polyethylene having a viscosity-average molecular weight (Mv) of 200000, 2.5 parts by mass of a polypropylene having Mv of 400000, 30 parts by mass of liquid paraffin (LP) as a plasticizer, and 0.5 part by mass of pentaerythrityl-tetrakis-[3-(3,5-di-t-butyl-4-hydroxyphenyl)

propionate] as an antioxidant were premixed in a Henschel mixer. The resulting mixture was supplied to the feed port of a co-rotating twin-screw extruder by using a feeder. Further, liquid paraffin was side-fed to the cylinder of the twin-screw extruder so that the mass ratio of the liquid paraffin in the whole mixture (100 parts by mass) to be melt-kneaded and extruded became 50 parts by mass. The melt kneading was conducted under the conditions of a preset temperature of 200° C., a screw rotation speed of 200 rpm, and a discharge rate of 15 kg/h. Then, the melt kneaded product was extruded through a T-die into between cooling rolls controlled to have a surface temperature of 25° C. to obtain a polyolefin composition in sheet form having a thickness of 1050 µm. The resulting polyolefin composition sheet was then continuously introduced into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying. Further, the drawn film was introduced into a TD tenter heat fixing machine and heat fixed. The heat fixing was conducted under the following conditions: maximum draw ratio of 1.5, final draw ratio of 1.3, preset temperature upon maximum drawing of 123° C. and preset temperature upon final drawing of 128° C. As a result, a polyolefin resin composition porous film having a thickness of 16 µm, porosity of 45%, and air permeability of 235 sec/100 cc was obtained.

(Formation of Porous Layer)

A coating solution was prepared by uniformly dispersing 98.2 parts by mass of alumina particles 6 shown in Table 3 and 1.8 parts by mass of polyvinyl alcohol (average polymerization degree: 1700, saponification degree: 99% or greater) in 150 parts by mass of water. The resulting coating solution was applied to the surface of the above-described polyolefin resin composition porous film by using a gravure coater. Water was then removed by drying at 60° C. to obtain a multilayer porous film having a porous layer of 3 µm thick formed on the polyolefin resin composition porous film.

Example 3-6

Preparation of Porous Film 16.6 Parts by mass of a polyethylene having a viscosity-average molecular weight (Mv) of 700000, 16.6 parts by mass of a polyethylene homopolymer having Mv of 250000, 1.8 parts by mass of a polypropylene having Mv of 400000, 40 parts by mass of liquid paraffin (LP) as a plasticizer, and 0.3 part by mass of pentaerythrityl-tetrakis-[3-(3,5-di-t-butyl-4-hydroxyphenyl)propionate] as an antioxidant were premixed in a Henschel mixer. The mixture thus obtained was supplied to the feed port of a co-rotating twin-screw extruder by using a feeder. Further, liquid paraffin was side-fed to the cylinder of the twin-screw extruder so that the mass ratio of the liquid paraffin in the whole mixture (100 parts by mass) to be melt kneaded and extruded became 65 parts by mass. The melt kneading was conducted under the conditions of a preset temperature of 200° C., a screw rotation speed of 240 rpm, and a discharge rate of 12 kg/h. Then, the melt kneaded product was extruded through a T-die into between cooling rolls controlled to have a surface temperature of 25° C. to obtain a polyolefin resin composition in sheet form having a thickness of 1000 µm. The resulting polyolefin resin composition sheet was then introduced into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying. Further, the drawn film was introduced into a TD tenter heat fixing machine and heat fixed. The heat fixing temperature was 130° C. and TD relax ratio was 0.80. As a result, a polyolefin resin composition porous film having a thickness of 12 µm, porosity of 36%, and air permeability of 235 sec/100 cc was obtained.

(Formation of Porous Layer)

A coating solution was prepared by uniformly dispersing 98.2 parts by mass of alumina particles 6 shown in Table 3 and 1.8 parts by mass of polyvinyl alcohol (average polymerization degree: 1700, saponification degree: 99% or greater) in 150 parts by mass of water. The resulting coating solution was applied to the surface of the above-described polyolefin resin porous film by using a gravure coater. Water was then removed by drying at 60° C. to obtain a multilayer porous film having a porous layer of 5 µm thick formed on the polyolefin resin composition porous film.

Example for Comparison 3-1

In the same manner as that employed in Example 3-1 except that a coating solution was prepared by uniformly dispersing 92.8 parts by weight of alumina particles 1 shown in Table 3 and 7.2 parts by weight of polyvinyl alcohol (average polymerization degree: 1700, saponification degree: 99% or greater) in 150 parts by weight of water and a porous layer of 8 µm thick was formed on the polyolefin resin composition porous film, a multilayer porous film was obtained.

Example for Comparison 3-2

In the same manner as that employed in Example 3-1 except that alumina particles 2 shown in Table 3 were used and the thickness of the porous layer was changed to 10 µm, a multilayer porous film was obtained.

Example for Comparison 3-3

In the same manner as that employed in Example 3-1 except that a coating solution was prepared by uniformly dispersing 96.4 parts by mass of alumina particles 3 shown in Table 3 and 3.6 parts by mass of polyvinyl alcohol (average polymerization degree: 1700, saponification degree: 99% or greater) in 150 parts by mass of water and a porous layer of 7 µm was formed on the polyolefin resin composition porous film, a multilayer porous film was obtained.

Example for Comparison 3-4

In the same manner as that employed in Example 3-1 except that alumina particles 4 shown in Table 3 were used and the thickness of the porous layer was changed to 8 µm, a multilayer porous film was obtained.

Example for Comparison 3-5

In the same manner as that employed in Example 3-1 except that alumina particles 8 shown in Table 3 were used and the thickness of the porous layer was changed to 6 μm, a multilayer porous film was obtained.

Example for Comparison 3-6

In the same manner as that employed in Example 3-1 except that alumina particles 9 shown in Table 3 were used and the thickness of the porous layer was changed to 6 μm, a multilayer porous film was obtained.

Example for Comparison 3-7

In the same manner as that employed in Example 3-1 except that alumina particles 10 shown in Table 3 were used and the thickness of the porous layer was changed to 7 μm, a multilayer porous film was obtained.

Example for Comparison 3-8

In the same manner as that employed in Example 3-1 except that alumina particles 11 shown in Table 3 were used and the thickness of the porous layer was changed to 8 μm, a multilayer porous film was obtained.

Example for Comparison 3-9

In the same manner as that employed in Example 3-4 except that alumina particles 3 shown in Table 3 were used and the thickness of the porous layer was changed to 8 μm, a multilayer porous film was obtained.

Example for Comparison 3-10

In the same manner as that employed in Example 3-4 except that alumina particles 8 shown in Table 3 were used and the thickness of the porous layer was changed to 6 μm, a multilayer porous film was obtained.

Example for Comparison 3-11

In the same manner as that employed in Example 3-5 except that alumina particles 2 shown in Table 3 were used and the thickness of the porous layer was changed to 7 μm, a multilayer porous film was obtained.

Example for Comparison 3-12

In the same manner as that employed in Example 3-5 except that alumina particles 8 shown in Table 3 were used and the thickness of the porous layer was changed to 7 μm, a multilayer porous film was obtained.

Example for Comparison 3-13

In the same manner as that employed in Example 3-6 except that alumina particles 8 shown in Table 3 were used and the thickness of the porous layer was changed to 8 μm, a multilayer porous film was obtained.

Comparative Example 3-14

In the same manner as that employed in Example 3-1 except that a porous layer was not formed, a porous film was obtained.

Comparative Example 3-15

In the same manner as that employed in Example 3-4 except that a porous layer was not formed, a porous film was obtained.

Comparative Example 3-16

In the same manner as that employed in Example 3-5 except that a porous layer was not formed, a porous film was obtained.

Comparative Example 3-17

In the same manner as that employed in Example 3-6 except that a porous layer was not formed, a porous film was obtained.

The air permeability, 150° C. heat shrinkage ratio, shutdown temperature, and short-circuit temperature of each of the multilayer porous films obtained in Examples 3-1 to 3-6, Examples for Comparison 3-1 to 3-13, and Comparative Examples 3-14 to 3-17 are shown in Table 4.

The porous films obtained in Comparative Examples 3-14 to 3-17 with no porous layer thereon showed a very high heat shrinkage ratio at 150° C. exceeding 50%.

On the other hand, the multilayer porous films of Examples for Comparison 3-1 to 3-13 having a porous layer formed with alumina particles, less than 50%, based on the total number of the particles, of which had a particle diameter greater than 0.4 μm but not greater than 1.5 μm had a reduced heat shrinkage ratio at 150° C. compared with the porous films obtained in Comparative Examples 3-14 to 3-17 with no alumina porous layer. Their heat shrinkage ratios were however 40% or greater in MD direction and 15% or greater in TD direction even when the porous layer had a thickness of 6 μm or greater.

On the other hand, the multilayer porous films of Examples 3-1 to 3-6 having a porous layer formed with alumina particles, 50% or greater, based on the total number of the particles, of which had a particle diameter greater than 0.4 μm but not greater than 1.5 μm showed a heat shrinkage ratio at 150° C. of 5% or less in both of MD direction and TD direction though the alumina porous layer was as thin as from 3 to 6 μm. Thus, they showed good heat-shrinkage resistance characteristics.

The air permeability of each of the multilayer porous films obtained in Examples 3-1 to 3-6 and Examples for Comparison 3-1 to 3-13 was as small as 300 sec/100 cc or less. In particular, since the alumina porous layer of each of the multilayer porous films obtained in Examples 3-1 to 3-6 was thin, an air permeability increase % of these films was reduced to 40% or less even compared with the porous films obtained in Comparative Examples 3-14 to 3-17 with no alumina porous layer thereon.

Simple batteries using, as a separator, the multilayer porous films or porous films obtained in Examples 3-1 to 3-6, Examples for Comparison 3-1 to 3-13, and Comparative Examples 3-14 to 3-17 each exhibited discharge rate characteristics and cycle characteristics of 90% or greater. It has been confirmed from these results that the multilayer porous films or porous films obtained in Examples 3-1 to 3-6, Examples for Comparison 3-1 to 3-13, and Comparative Examples 3-14 to 3-17 are usable as a battery separator. Further, these multilayer porous films or porous films had a shutdown temperature of from 144 to 148° C., indicating that they had a good shutdown function.

The porous films of Comparative Example 3-14 to 3-17 obtained with no alumina porous layer caused short circuit only by heating to shutdown temperature+several ° C., but none of the multilayer porous films obtained in Examples 3-1 to 3-6 and Examples for Comparison 3-1 to 3-13 having a porous layer formed thereon caused short circuit by heating even to 180° C. or greater. In particular, the multilayer porous films obtained in Examples 3-1 to 3-6 did not cause short circuit even by heating to 200° C. and thus had excellent heat resistance.

TABLE 3

| | Particle diameter distribution (vol. %) | | | | | | | |
|---|---|---|---|---|---|---|---|---|
| | Up to 0.2 μm | Up to 0.4 μm | Up to 0.5 μm | Up to 0.6 μm | Up to 0.8 μm | Up to 1.0 μm | Up to 1.2 μm | Up to 1.5 μm |
| Alumina particles 1 | 87 | 13 | 1 | 0 | 0 | 0 | 0 | 0 |
| Alumina particles 2 | 50 | 30 | 5 | 6 | 4 | 3 | 2 | 0 |
| Alumina particles 3 | 27 | 29 | 11 | 5 | 5 | 2 | 1 | 1 |
| Alumina particles 4 | 12 | 33 | 17 | 8 | 8 | 5 | 3 | 4 |
| Alumina particles 5 | 0 | 13 | 20 | 19 | 25 | 13 | 5 | 3 |
| Alumina particles 6 | 0 | 13 | 18 | 13 | 14 | 10 | 6 | 9 |
| Alumina particles 7 | 0 | 1 | 5 | 6 | 12 | 13 | 10 | 24 |
| Alumina particles 8 | 0 | 2 | 7 | 8 | 12 | 9 | 5 | 7 |
| Alumina particles 9 | 0 | 0 | 1 | 2 | 4 | 5 | 4 | 8 |
| Alumina particles 10 | 0 | 0 | 0 | 1 | 2 | 3 | 3 | 8 |
| Alumina particles 11 | 0 | 0 | 0 | 0 | 0 | 0 | 0 | 0 |

| | Particle diameter distribution (vol. %) | | | | | | Average particle diameter (μm) |
|---|---|---|---|---|---|---|---|
| | Up to 2.0 μm | Up to 5.0 μm | Over 5.0 μm | 0.4 μm to 1.5 μm | 0.5 μm to 1.5 μm | 0.5 μm to 1.2 μm | |
| Alumina particles 1 | 0 | 0 | 0 | 1 | 0 | 0 | 0.08 |
| Alumina particles 2 | 0 | 0 | 0 | 20 | 15 | 15 | 0.20 |
| Alumina particles 3 | 1 | 3 | 14 | 26 | 15 | 13 | 0.33 |
| Alumina particles 4 | 4 | 6 | 0 | 46 | 29 | 25 | 0.41 |
| Alumina particles 5 | 1 | 0 | 0 | 86 | 66 | 62 | 0.52 |
| Alumina particles 6 | 8 | 10 | 0 | 69 | 51 | 43 | 0.80 |
| Alumina particles 7 | 15 | 13 | 0 | 70 | 65 | 42 | 1.19 |
| Alumina particles 8 | 8 | 37 | 4 | 49 | 41 | 34 | 1.47 |
| Alumina particles 9 | 13 | 61 | 3 | 23 | 22 | 14 | 2.33 |
| Alumina particles 10 | 13 | 66 | 5 | 17 | 16 | 9 | 2.51 |
| Alumina particles 11 | 2 | 81 | 17 | 0 | 0 | 0 | 3.57 |

TABLE 4

| | Porous film | | | Porous layer | | | | |
|---|---|---|---|---|---|---|---|---|
| | | | | | Particle diameter distribution of alumina particles (vol. %) | | | |
| | Film thickness (μm) | Porosity (%) | Air permeability (sec) | Kind of alumina particles | 0.4 μm to 1.5 μm | 0.5 μm to 1.5 μm | 0.5 μm to 1.2 μm | Layer thickness (μm) |
| Ex. 3-1 | 16 | 49 | 155 | Alumina particles 5 | 86 | 66 | 62 | 5 |
| Ex. 3-2 | 16 | 49 | 155 | Alumina particles 6 | 69 | 51 | 43 | 4 |

TABLE 4-continued

| | | | | | | | | |
|---|---|---|---|---|---|---|---|---|
| Ex. 3-3 | 16 | 49 | 155 | Alumina particles 7 | 70 | 65 | 42 | 6 |
| Ex. 3-4 | 16 | 40 | 165 | Alumina particles 6 | 69 | 51 | 43 | 6 |
| Ex. 3-5 | 16 | 45 | 235 | Alumina particles 6 | 69 | 51 | 43 | 3 |
| Ex. 3-6 | 12 | 36 | 235 | Alumina particles 6 | 69 | 51 | 43 | 5 |
| Ex. for Comp. 3-1 | 16 | 49 | 155 | Alumina particles 1 | 1 | 0 | 0 | 8 |
| Ex. for Comp. 3-2 | 16 | 49 | 155 | Alumina particles 2 | 20 | 15 | 15 | 10 |
| Ex. for Comp. 3-3 | 16 | 49 | 155 | Alumina particles 3 | 26 | 15 | 13 | 7 |
| Ex. for Comp. 3-4 | 16 | 49 | 155 | Alumina particles 4 | 46 | 29 | 25 | 8 |
| Ex. for Comp. 3-5 | 16 | 49 | 155 | Alumina particles 8 | 49 | 41 | 34 | 6 |
| Ex. for Comp. 3-6 | 16 | 49 | 155 | Alumina particles 9 | 23 | 22 | 14 | 6 |
| Ex. for Comp. 3-7 | 16 | 49 | 155 | Alumina particles 10 | 17 | 16 | 9 | 7 |
| Ex. for Comp. 3-8 | 16 | 49 | 155 | Alumina particles 11 | 0 | 0 | 0 | 8 |
| Ex. for Comp. 3-9 | 16 | 40 | 165 | Alumina particles 3 | 26 | 15 | 13 | 8 |
| Ex. for Comp. 3-10 | 16 | 40 | 165 | Alumina particles 8 | 49 | 41 | 34 | 6 |
| Ex. for Comp. 3-11 | 16 | 45 | 235 | Alumina particles 2 | 20 | 15 | 15 | 7 |
| Ex. for Comp. 3-12 | 16 | 45 | 235 | Alumina particles 8 | 49 | 41 | 34 | 7 |
| Ex. for Comp. 3-13 | 12 | 36 | 235 | Alumina particles 8 | 49 | 41 | 34 | 8 |
| Comp. Ex. 3-14 | 16 | 49 | 155 | None | — | — | — | 0 |
| Comp. Ex. 3-15 | 16 | 40 | 165 | None | — | — | — | 0 |
| Comp. Ex. 3-16 | 16 | 45 | 235 | None | — | — | — | 0 |
| Comp. Ex. 3-17 | 12 | 36 | 235 | None | — | — | — | 0 |

| | Multilayer porous film | | | | |
|---|---|---|---|---|---|
| | Air permeability (sec) | Air permeability increase (%) | 150° C. heat shrinkage ratio | | Shutdown Temp. (° C.) | Short circuit Temp. (° C.) |
| | | | MD (%) | TD (%) | | |
| Ex. 3-1 | 210 | 35 | 4 | 3 | 145 | >200 |
| Ex. 3-2 | 177 | 14 | 3 | 3 | 146 | >200 |
| Ex. 3-3 | 215 | 39 | 5 | 3 | 146 | >200 |
| Ex. 3-4 | 195 | 18 | 3 | 2 | 146 | >200 |
| Ex. 3-5 | 245 | 4 | 4 | 3 | 145 | >200 |
| Ex. 3-6 | 238 | 1 | 2 | 2 | 148 | >200 |
| Ex. for Comp. 3-1 | 200 | 29 | 50 | 20 | 147 | >200 |
| Ex. for Comp. 3-2 | 181 | 17 | 59 | 19 | 146 | >200 |
| Ex. for Comp. 3-3 | 198 | 28 | 56 | 22 | 146 | >200 |
| Ex. for Comp. 3-4 | 186 | 20 | 50 | 16 | 146 | >200 |
| Ex. for Comp. 3-5 | 215 | 39 | 55 | 17 | 145 | >200 |
| Ex. for Comp. 3-6 | 220 | 42 | 59 | 23 | 146 | >200 |
| Ex. for Comp. 3-7 | 245 | 58 | 55 | 22 | 144 | >200 |
| Ex. for Comp. 3-8 | 238 | 54 | 56 | 28 | 146 | >200 |
| Ex. for Comp. 3-9 | 190 | 15 | 40 | 38 | 147 | 183 |
| Ex. for Comp. 3-10 | 295 | 79 | 47 | 45 | 147 | 188 |
| Ex. for Comp. 3-11 | 290 | 23 | 49 | 43 | 146 | >200 |
| Ex. for Comp. 3-12 | 280 | 19 | 42 | 41 | 146 | >200 |
| Ex. for Comp. 3-13 | 280 | 19 | 51 | 40 | 150 | >200 |
| Comp. Ex. 3-14 | 155 | 0 | 73 | 53 | 148 | 152 |
| Comp. Ex. 3-15 | 165 | 0 | 60 | 50 | 145 | 155 |
| Comp. Ex. 3-16 | 235 | 0 | 69 | 67 | 147 | 149 |
| Comp. Ex. 3-17 | 235 | 0 | 57 | 59 | 147 | 153 |

Example 4-1

Preparation of Porous Film 47.5 Parts by mass of a polyethylene homopolymer having Mv of 700000, 47.5 parts by mass of a polyethylene homopolymer having Mv of 250000, and 5 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl) propionate] as an antioxidant, followed by dry blending again in a tumbler blender to obtain a mixture comprising polymers and so on. After purging with nitrogen, the resulting mixture comprising polymers and so on was supplied to a twin-screw extruder by using a feeder under nitrogen atmosphere. Further, liquid paraffin (dynamic viscosity at 37.78° C.: 7.59×10$^{-5}$ m$^2$/s) was poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C. to obtain a polyolefin composition in sheet form having a thickness of 1300 μm.

The resulting polyolefin composition sheet was then introduced into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 122° C. and TD relax ratio was 0.80. As a result, a polyolefin resin composition porous film having a thickness of 16 μm, porosity of 49%, and air permeability of 155 sec/100 cc was obtained.

(Formation of Porous Layer)

A coating solution was prepared by uniformly dispersing 98.2 parts by mass of columnar light calcium carbonate particles A (L2/L1=6.5, their SEM image is shown in FIG. 1) and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 2 μm thick formed on the polyolefin resin composition porous film.

Example 4-2

Figure 2:
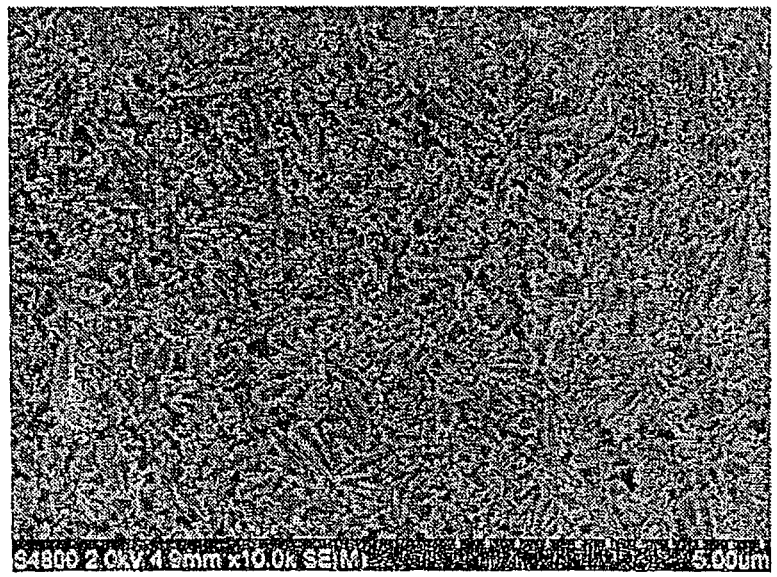
FIG. 2 is a scanning electron microscope image of the calcium carbonate particles used in Example 4-2.

In the same manner as that employed in Example 4-1 except that a coating solution was prepared by uniformly dispersing 98.2 parts by mass of spindle-shaped light calcium carbonate particles B (L2/L1=2.73, their SEM image is shown in FIG. 2) and 1.8 parts by mass of polyvinyl alcohol (average polymerization degree: 1700, saponification degree: 99% or greater) in 150 parts by mass of water; the resulting coating solution was applied on the surface of the above-described polyolefin resin porous film by using a gravure coater; water was removed by drying at 60° C.; and a porous layer of 3 μm thick was formed on the polyolefin resin composition porous film, a multilayer porous film was obtained.

Example 4-3

In the same manner as that employed in Example 4-1 except that a coating solution was prepared by uniformly dispersing 98.2 parts by mass of spindle-shaped light calcium carbonate particles B, 1.8 parts by mass of acrylic latex (solid concentration: 50%, minimum film-forming temperature: 0° C. or less), 1 part by weight of an aqueous solution of ammonium polycarboxylate ("SN-Dispersant 5468", product of San Nopco Limited) and 1 part by weight of a polyoxyalkylene surfactant ("SN-Wet 980", product of San Nopco Limited) in 150 parts by mass of water; and a porous layer of 4 μm thick was formed on the polyolefin resin composition porous film, a multilayer porous film was obtained.

Example 4-4

Preparation of Porous Film

47 Parts by mass of a polyethylene homopolymer having Mv of 700000, 46 parts by mass of a polyethylene homopolymer having Mv of 250000, and 7 parts by mass of a polypropylene homopolymer having Mv of 400000 were dry blended in a tumbler blender. To 99 mass % of the pure polymer mixture thus obtained was added 1 mass % of pentaerythrityl-tetrakis-[3-(3,5-di-t-butyl-4-hydroxyphenyl)propionate] as an antioxidant, followed by dry blending again in a tumbler blender to obtain a mixture comprising polymers and the like. After purging with nitrogen, the resulting mixture comprising polymers and the like was supplied to a twin-screw extruder by using a feeder under nitrogen atmosphere. Further, liquid paraffin (dynamic viscosity at 37.78° C.: 7.59×10$^{-5}$ m$^2$ was as poured into the cylinder of the extruder as a plasticizer by using a plunger pump. The feeder and the pump were adjusted so that the mass ratio of the liquid paraffin in the whole mixture to be melt kneaded and extruded became 65 mass %. The melt kneading was conducted under the conditions of a preset temperature of 200° C., a screw rotation speed of 240 rpm, and a discharge rate of 12 kg/h.

Then, the melt kneaded product was extruded through a T-die and cast on a cooling roll controlled to have a surface temperature of 25° C. to obtain a polyolefin composition in sheet form having a thickness of 2000 μm.

The resulting polyolefin composition sheet was then introduced into a simultaneous biaxial tenter drawing machine, in which the sheet was subjected to simultaneous biaxial drawing 7 times in MD direction and 7 times in TD direction. At the time of drawing, the preset temperature of the simultaneous biaxial tenter was 125° C. Then, the drawn film thus obtained was introduced into a methyl ethyl ketone tank to extract and remove the liquid paraffin. Then, methyl ethyl ketone was removed by drying.

Further, the drawn film was introduced into a TD tenter heat fixing machine and heat fixed. The heat fixing temperature was 133° C. and TD relax ratio was 0.80. As a result, a polyolefin resin composition porous film having a thickness of 16 μm, porosity of 40%, and air permeability of 165 sec/100 cc was obtained.

Formation of Porous Layer

A coating solution was prepared by uniformly dispersing 98.2 parts by mass of spindle-shaped light calcium carbonate particles B and 1.8 parts by mass of polyvinyl alcohol (average polymerization degree: 1700, saponification degree: 99% or greater) in 150 parts by mass of water. The resulting coating solution was applied on the surface of the above-described polyolefin resin composition porous film by using a gravure coater. Water was then removed by drying at 60° C. to obtain a multilayer porous film having a porous layer of 2 μm thick formed on the polyolefin resin composition porous film.

Example 4-5

47.5 Parts by mass of a polyethylene having a viscosity-average molecular weight (Mv) of 200000, 2.5 parts by mass of a polypropylene having Mv of 400000, 30 parts by mass of liquid paraffin (LP) as a plasticizer, and 0.5 part by mass of pentaerythrityl-tetrakis-[3-(3,5-di-t-butyl-4-hydroxyphenyl)

propionate] as an antioxidant were premixed in a Henschel mixer. The mixture thus obtained was supplied to the feed port of a co-rotating twin-screw extruder by using a feeder. Further, liquid paraffin was side-fed to the cylinder of the twin-screw extruder so that the mass ratio of the liquid paraffin in the whole mixture (100 parts by mass) to be melt kneaded and extruded became 50 parts by mass. The melt kneading was conducted under the conditions of a preset temperature of 200° C., a screw rotation speed of 200 rpm, and a discharge rate of 15 kg/h. Then, the melt kneaded product was extruded through a T-die into between cooling rolls controlled to have a surface temperature of 25° C. to obtain a polyolefin resin composition in sheet form having a thickness of 1050 µm. The resulting polyolefin resin composition sheet was then introduced into a simultaneous biaxial tenter drawing machine, in which the sheet was subjected to simultaneous biaxial drawing 7 times in MD and 6.4 times in TD direction. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying. Further, the drawn film was introduced into a TD tenter heat fixing machine and heat fixed. The heat fixing was conducted under the following conditions: maximum draw ratio of 1.5, final draw ratio of 1.3, preset temperature of 123° C. upon maximum drawing, and preset temperature of 128° C. upon final drawing. As a result, a polyolefin resin composition porous film having a thickness of 16 µm, porosity of 45%, and air permeability of 235 sec/100 cc was obtained.

(Formation of Porous Layer)

A coating solution was prepared by uniformly dispersing 98.2 parts by mass of spindle-shaped light calcium carbonate particles B and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 2 µm thick formed on the polyolefin resin composition porous film.

Example 4-6

Preparation of Porous Film 16.6 Parts by mass of a polyethylene having a viscosity-average molecular weight (Mv) of 700000, 16.6 parts by mass of a polyethylene having Mv of 250000, 1.8 parts by mass of a polypropylene having Mv of 400000, 40 parts by mass of liquid paraffin (LP) as a plasticizer, and 0.3 part by mass of pentaerythrityl-tetrakis-[3-(3,5-di-t-butyl-4-hydroxyphenyl) propionate] as an antioxidant were premixed in a Henschel mixer. The mixture thus obtained was supplied to the feed port of a co-rotating twin-screw extruder by using a feeder. Further, liquid paraffin was side-fed to the cylinder of the twin-screw extruder so that the mass ratio of the liquid paraffin in the whole mixture (100 parts by mass) to be melt kneaded and extruded became 65 parts by mass. The melt kneading was conducted under the conditions of a preset temperature of 200° C., a screw rotation speed of 240 rpm, and a discharge rate of 12 kg/h. Then, the melt kneaded product was extruded through a T-die into between cooling rolls controlled to have a surface temperature of 25° C. to obtain a polyolefin composition in sheet form having a thickness of 1000 µm. The resulting polyolefin composition was then introduced into a simultaneous biaxial tenter drawing machine, in which the sheet was subjected to simultaneous biaxial drawing 7 times in MD direction and 6.4 times in TD direction. At the time of drawing, the preset temperature of the simultaneous biaxial tenter was 118° C. Then, the drawn film thus obtained was introduced into a methyl ethyl ketone tank to remove the plasticizer. Then, methyl ethyl ketone was removed by drying. Further, the drawn film was introduced into a TD tenter heat fixing machine and heat fixed. The heat fixing temperature was 130° C. and TD relax ratio was 0.80. As a result, a polyolefin resin composition porous film having a thickness of 12 µm, porosity of 36%, and air permeability of 235 sec/100 cc was obtained.

(Formation of Porous Layer)

A coating solution was prepared by uniformly dispersing 98.2 parts by mass of spindle-shaped light calcium carbonate particles B and 1.8 parts by mass of polyvinyl alcohol (average polymerization degree: 1700, saponification degree: 99% or greater) in 150 parts by mass of water. The resulting coating solution was applied on the surface of the above-described polyolefin resin porous film by using a gravure coater. Water was then removed by drying at 60° C. to obtain a multilayer porous film having a porous layer of 4 µm thick formed on the polyolefin resin composition porous film.

Example for Comparison 4-1

Figure 3:
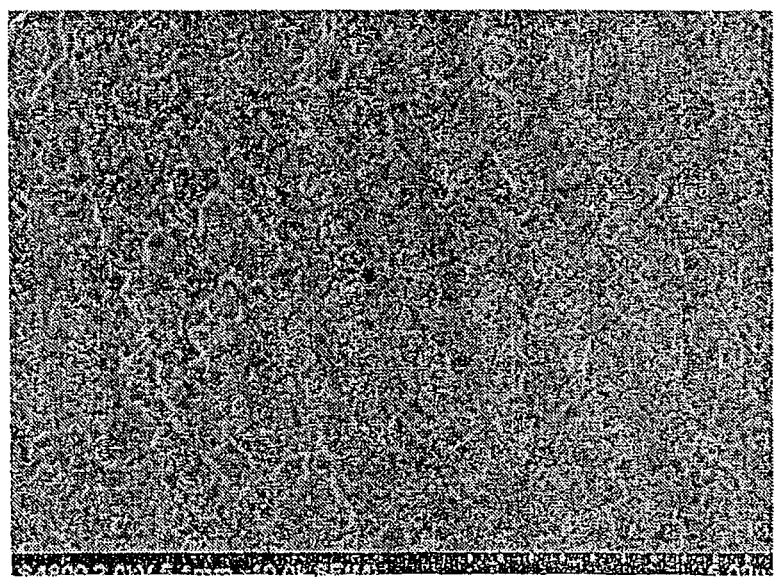
FIG. 3 is a scanning electron microscope image of the calcium carbonate particles used in Example for Comparison 4-1.
Figure 4:
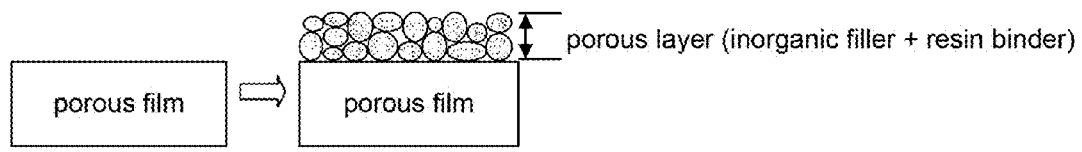
FIG. 4 is a representation of a multilayer porous film.

In the same manner as that employed in Example 4-1 except that a coating solution was prepared by uniformly dispersing 98.2 parts by weight of amorphous heavy calcium carbonate particles C (their SEM image is shown in FIG. 3) prepared by the wet grinding process and 1.8 parts by weight of polyvinyl alcohol (average polymerization degree of 1700, saponification degree of 99% or greater) in 150 parts by weight of water; and a porous layer of 5 µm thick was prepared on the polyolefin resin composition porous film, a multilayer porous film was obtained.

Comparative Example 4-2

In the same manner as that employed in Example 4-1 except that a porous layer was not formed, a porous film was obtained.

Comparative Example 4-3

In the same manner as that employed in Example 4-4 except that a porous layer was not formed, a porous film was obtained.

Comparative Example 4-4

In the same manner as that employed in Example 4-5 except that a porous layer was not formed, a porous film was obtained.

Comparative Example 4-5

In the same manner as that employed in Example 4-6 except that a porous layer was not formed, a porous film was obtained.

The air permeability, 150° C. heat shrinkage ratio, shut-down temperature, and short-circuit temperature of the multilayer porous films and porous films obtained in Examples 4-1 to 4-6, Example for Comparison 4-1, and Comparative Examples 4-2 to 4-5 are shown in Table 5.

The porous films obtained in Comparative Examples 4-2 to 4-5 with no porous layer thereon showed a very high 150° C. heat shrinkage ratio exceeding 50%.

On the other hand, the multilayer porous film of Example for Comparison 4-1 whose porous layer had been formed using amorphous heavy calcium carbonate had a reduced heat shrinkage ratio at 150° C. compared with the porous films obtained in Comparative Examples 4-2 to 4-5 with no porous layer thereon. However, its heat shrinkage ratio was 50% or greater in MD direction and 10% or greater even in TD direction even when the porous layer had a thickness of 5 μm or greater.

On the other hand, the multilayer porous films of Examples 4-1 to 4-6 whose porous layers had been formed using particles composed mainly of columnar, needle-like, or spindle-shaped light calcium carbonate showed a 150° C. heat shrinkage ratio of 4% or less in both of MD direction and TD direction, though the thickness of the porous layer was as thin as from 2 to 4 μm. Thus, they showed good heat-shrinkage resistance characteristics.

The air permeability of each of the multilayer porous films obtained in Examples 4-1 to 4-6 was as small as 250 sec/100 cc or less. In particular, an air permeability increase % of these films was reduced to 30% or less even compared with the porous films obtained in Comparative Examples 4-2 to 4-5 with no porous layer.

Simple batteries using, as a separator, the multilayer porous films or porous films obtained in Examples 4-1 to 4-6, Example for Comparison 4-1, and Comparative Examples 4-2 to 4-5 each exhibited discharge rate characteristics and cycle characteristics of 90% or greater. It has been confirmed from these results that the multilayer porous films or porous films obtained in Examples 4-1 to 4-6, Example for Comparison 4-1, and Comparative Examples 4-2 to 4-5 are usable as a battery separator. Further, these multilayer porous films or porous films had a shutdown temperature of from 145 to 148° C., indicating that they had a good shutdown function.

The porous films of Comparative Examples 4-2 to 4-5 with no porous layer thereon caused short circuit only by heating to shutdown temperature+several ° C., but none the multilayer porous films obtained in Examples 4-1 to 4-6 having thereon a porous layer made of particles composed mainly of columnar, needle-like, or spindle-shaped light calcium carbonate caused short circuit even by heating to 200° C. or greater and thus had excellent heat resistance.

TABLE 5

| | Porous film | | | Inorganic filler | Binder | | Thickness of | Air | 150° C. heat shrinkage | | High speed method | |
|---|---|---|---|---|---|---|---|---|---|---|---|---|
| | Film thickness (μm) | Porosity (%) | Air permeability (sec/100 cc) | Kind of calcium carbonate | Kind | Binder ratio (%) | inorganic layer (μm) | Air permeability (sec/100 cc) | permeability increase (%) | MD (%) | TD (%) | Fuse (° C.) | Short (° C.) |
| Ex. 4-1 | 16 | 49 | 155 | Columnar, light A | PVA | 1.8 | 2 | 184 | 19 | 2 | 2 | 150 | 200 |
| Ex. 4-2 | 16 | 49 | 155 | Spindle, light B | PVA | 1.8 | 3 | 180 | 16 | 2 | 1 | 152 | 200 |
| Ex. 4-3 | 16 | 49 | 155 | Spindle, light B | Acl | 1.8 | 4 | 195 | 26 | 4 | 2 | 148 | 200 |
| Ex. 4-4 | 16 | 40 | 165 | Spindle, light B | PVA | 1.8 | 2 | 190 | 15 | 1 | 1 | 146 | 200 |
| Ex. 4-5 | 16 | 45 | 235 | Spindle, light B | PVA | 1.8 | 2 | 245 | 4 | 1 | 1 | 147 | 200 |
| Ex. 4-6 | 12 | 36 | 235 | Spindle, light B | PVA | 1.8 | 4 | 250 | 6 | 1 | 1 | 149 | 200 |
| Ex. for Comp. 4-1 | 16 | 49 | 155 | Amorphous, heavy C | PVA | 1.8 | 5 | 190 | 23 | 50 | 14 | 147 | 200 |
| Comp. Ex. 4-2 | 16 | 49 | 155 | None | — | — | 0 | 155 | 0 | 73 | 53 | 148 | 152 |
| Comp. Ex. 4-3 | 16 | 40 | 165 | None | — | — | 0 | 165 | 0 | 60 | 50 | 145 | 155 |
| Comp. Ex. 4-4 | 16 | 45 | 235 | None | — | — | 0 | 235 | 0 | 69 | 67 | 147 | 149 |
| Comp. Ex. 4-5 | 12 | 36 | 235 | None | — | — | 0 | 235 | 0 | 57 | 59 | 147 | 153 |

INDUSTRIAL APPLICABILITY

The multilayer porous films according to the first to fourth aspects of the present invention are excellent in heat resistance so that they are suited for use in separation or purification of various substances at high temperatures.

The multilayer porous films according to the first to fourth aspects of the present invention have a shutdown function so that they are particularly suited for use as a battery separator. Above all, they are suited as a separator for lithium ion secondary batteries.

The invention claimed is:

1. A multilayer porous film comprising:
   a porous film which is composed of a resin composition comprising a polypropylene and one or more polyolefins other than polypropylenes, wherein the polypropylene content in the resin composition is from 0.5 to 35 mass % based on the total amount of the polyolefins, and
   a porous layer stacked and adhered on at least one side of the porous film and comprising an inorganic filler and a resin binder, wherein the mass fraction of the inorganic filler in the porous layer is 95% or greater and less than 100%.

2. A multilayer porous film comprising:
   a porous film comprising a polyolefin resin as a main component thereof, wherein 0.5 to 35% of the polyolefin resin is polypropylene based on the total amount of polyolefins, and
   a porous layer adhered on at least one side of the porous film, such porous layer being composed of a resin binder and alumina particles having an average particle diameter of 0.5 μm or greater but not greater than 1.2 μm, wherein the mass fraction of the alumina particles in the porous layer is 95% or greater and less than 100%.

3. The multilayer porous film according to claim 2, wherein the porous film is composed of a resin composition comprising a polypropylene and one or more polyolefins other than polypropylenes.

4. The multilayer porous film according to claim 2 or 3, wherein the porous layer has a thickness of 3 μm or greater but not greater than 6 μm.

5. A multilayer porous film comprising:
- a porous film comprising a polyolefin resin as a main component thereof, wherein 0.5 to 35% of the polyolefin resin is polypropylene based on the total amount of polyolefins, and
- a porous layer adhered on a least one side of the porous film, such porous layer being composed of a resin binder and alumina particles, 50% or greater of the total number of the alumina particles having a particle diameter of 0.4 μm or greater but not greater than 1.5 μm, wherein the mass fraction of the alumina particles in the porous layer is 95% or greater and less than 100%.

6. The multilayer porous film according to claim 5, wherein 45% or greater of the total number of the alumina particles have a particle diameter of 0.5 μm or greater but not greater than 1.5 μm.

7. The multilayer porous film according to claim 5 or 6, wherein 35% or greater of the total number of the alumina particles have a particle diameter of 0.5 μm or greater but not greater than 1.2 μm.

8. The multilayer porous film according to claim 5 or 6, wherein the porous film is composed of a resin composition comprising a polypropylene and one or more polyolefins other than polypropylenes.

9. The multilayer porous film according to claim 5 or 6, wherein the porous layer has a thickness of 3 μm or greater but not greater than 6 μm.

10. A multilayer porous film comprising:
- a porous film comprising a polyolefin resin as a main component thereof, wherein 0.5 to 35% of the polyolefin resin is polypropylene based on the total amount of polyolefins, and
- a porous layer adhered on at least one side of the porous film, such porous layer being composed of a resin binder and particles comprising light calcium carbonate as a main component thereof, wherein the mass fraction of the particles in the porous layer is 95% or greater and less than 100%.

11. The multilayer porous film according to claim 10, wherein the particles comprising light calcium carbonate as a main component thereof are columnar, needle-shaped, or spindle-shaped particles.

12. The multilayer porous film according to claim 10 or 11, wherein the porous film is composed of a resin composition comprising a polypropylene and polyolefins other than polypropylenes.

13. The multilayer porous film according to claim 10 or 11, wherein the porous layer has a thickness of 2 μm or greater but not greater than 5 μm.

14. The multilayer porous film according to any one of claims 1 to 3, 5, 6, 10 and 11, wherein the polypropylene content in the resin composition is from 1 to 30 mass % based on the total amount of the polyolefins.

15. The multilayer porous film according to any one of claims 1 to 3, 5, 6, 10 and 11, wherein the polyolefins other than the polypropylene is a polyethylene.

16. A nonaqueous electrolyte battery separator comprising the multilayer porous film as claimed in any one of claims 1 to 3, 5, 6, 10 and 11.

17. A nonaqueous electrolyte battery comprising the battery separator as claimed in claim 16.

18. The multilayer porous film according to claim 5, wherein 65% or greater of the total number of alumina particles have a particle diameter of 0.4 μm or greater but not greater than 1.5 μm.

* * * * *